US009524003B2

(12) United States Patent
Yamada

(10) Patent No.: US 9,524,003 B2
(45) Date of Patent: *Dec. 20, 2016

(54) INPUT DEVICE THAT IS WORN BY USER AND INPUT METHOD

(71) Applicant: FUJITSU LIMITED, Kawasaki-shi, Kanagawa (JP)

(72) Inventor: Moyuru Yamada, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 5 days.

This patent is subject to a terminal disclaimer.

(21) Appl. No.: 14/559,018

(22) Filed: Dec. 3, 2014

(65) Prior Publication Data

US 2015/0193014 A1    Jul. 9, 2015

(30) Foreign Application Priority Data

Jan. 8, 2014  (JP) ................................. 2014-001987
May 20, 2014  (JP) ................................. 2014-104322

(51) Int. Cl.
*G06F 1/16*  (2006.01)
*G06F 3/01*  (2006.01)

(52) U.S. Cl.
CPC ............. *G06F 1/1615* (2013.01); *G06F 1/163* (2013.01); *G06F 1/1694* (2013.01); *G06F 3/017* (2013.01)

(58) Field of Classification Search
CPC .......... G06F 3/017; G06F 3/013; G06F 3/011; G06F 3/016; G06F 3/0346; G06F 3/012; G06F 3/0304
See application file for complete search history.

(56) References Cited

U.S. PATENT DOCUMENTS

| 3,545,266 A * | 12/1970 | Wilson | .................. G01C 21/16 701/123 |
| 5,645,077 A | 7/1997 | Foxlin | |
| 2009/0027337 A1 | 1/2009 | Hildreth | |

(Continued)

FOREIGN PATENT DOCUMENTS

| JP | 2010-534895 | 11/2010 |
| JP | 2012-242901 | 12/2012 |

(Continued)

OTHER PUBLICATIONS

Office Action dated Feb. 2, 2016 for U.S. Appl. No. 14/561,965.
Office Action dated May 19, 2016 for U.S. Appl. No. 14/561,965.

*Primary Examiner* — Olga Merkoulova
(74) *Attorney, Agent, or Firm* — Staas & Halsey LLP

(57) ABSTRACT

An input device, that is worn on a portion of a user's body, includes: a sensor unit configured to obtain angular velocities and an acceleration in a first coordinate system fixed in the input device; a reference posture specification unit configured to generate a second coordinate system for a reference posture of the user; a rotation matrix calculator configured to calculate a rotation matrix that transforms the angular velocities in the first coordinate system into angular velocities in the second coordinate system using the acceleration in the first coordinate system; a characteristic value calculator configured to calculate characteristic values in the second coordinate system using the angular velocities in the second coordinate system; a command specification unit configured to specify a command according to the characteristic values; and a transmitter configured to transmit the command to the controller.

15 Claims, 36 Drawing Sheets

(56) References Cited

U.S. PATENT DOCUMENTS

| | | | |
|---|---|---|---|
| 2009/0031240 A1 | 1/2009 | Hildreth | |
| 2009/0295722 A1* | 12/2009 | Yamamoto | G06F 3/0346 345/158 |
| 2010/0103096 A1 | 4/2010 | Yamamoto et al. | |
| 2012/0272194 A1* | 10/2012 | Yang | G06F 3/017 715/863 |
| 2012/0302345 A1* | 11/2012 | Shikata | A63F 13/06 463/36 |
| 2013/0023341 A1 | 1/2013 | Yamanouchi | |
| 2013/0190908 A1* | 7/2013 | Ellis | A61B 5/1038 700/91 |
| 2014/0118249 A1 | 5/2014 | Hildreth | |
| 2014/0282270 A1* | 9/2014 | Slonneger | G06F 3/017 715/863 |
| 2015/0185765 A1* | 7/2015 | Peek | G02B 6/42 351/158 |
| 2015/0297437 A1* | 10/2015 | Neuenhahn | A61B 5/4848 601/148 |

FOREIGN PATENT DOCUMENTS

| | | |
|---|---|---|
| WO | 2009/008372 A1 | 1/2009 |
| WO | WO 2009/018161 A1 | 2/2009 |
| WO | WO 2011/122214 A1 | 10/2011 |

* cited by examiner

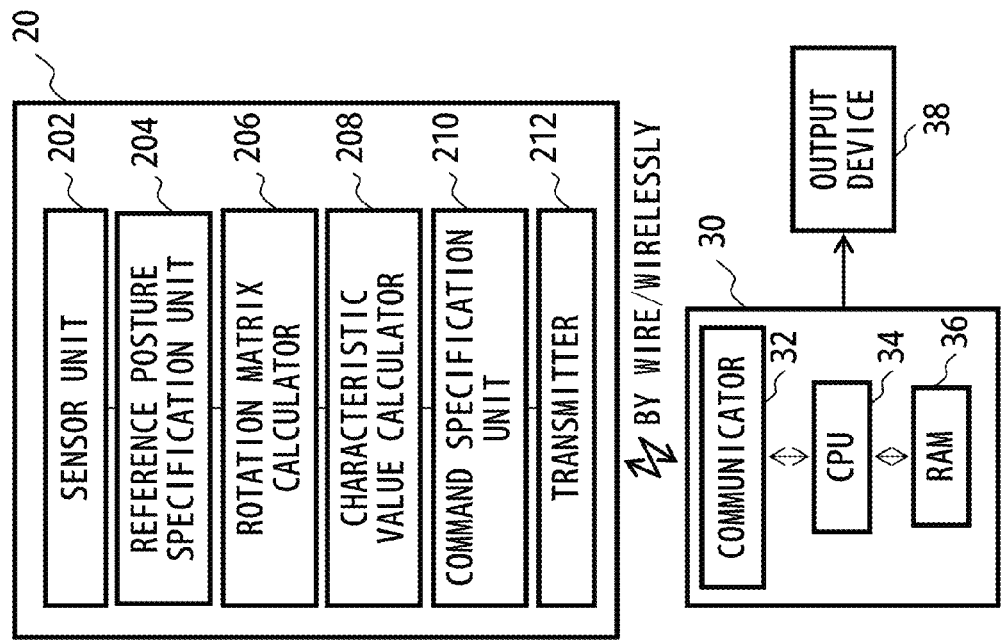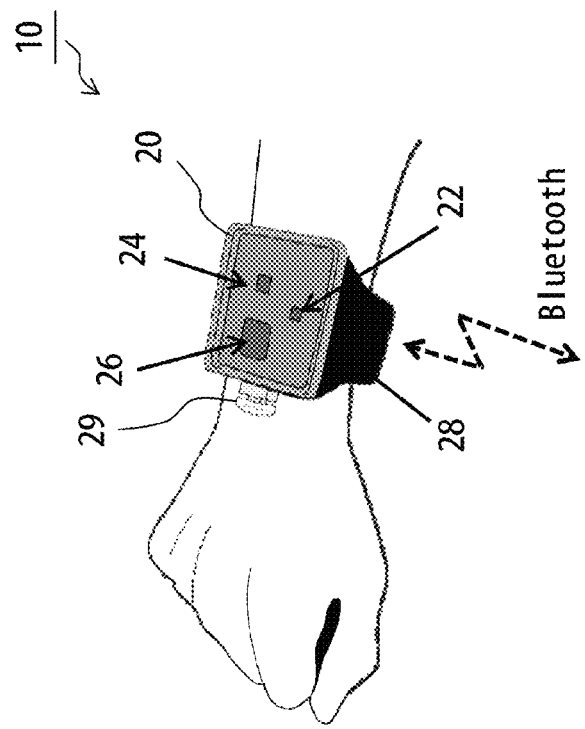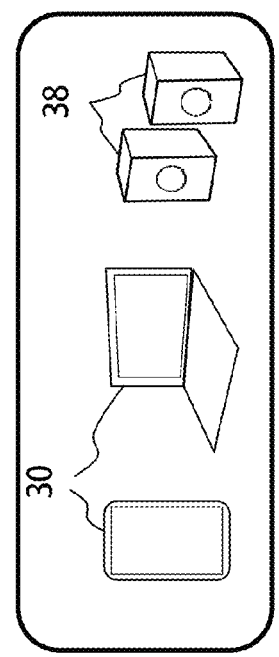
FIG. 1

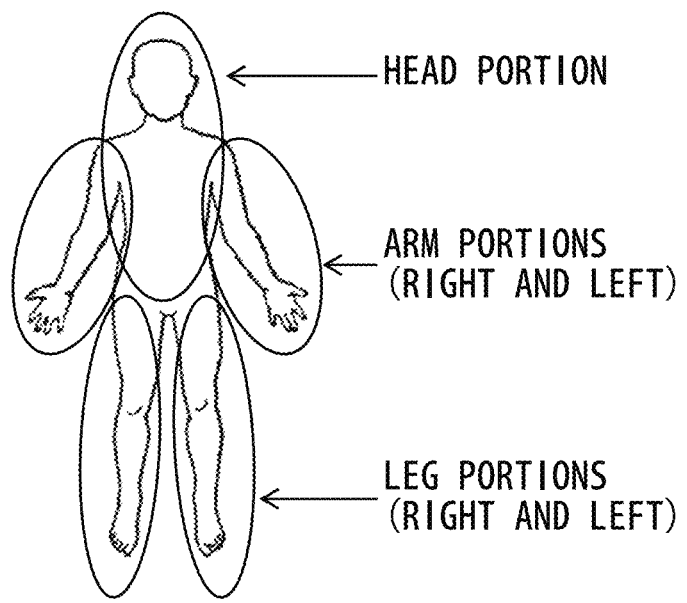
F I G. 3

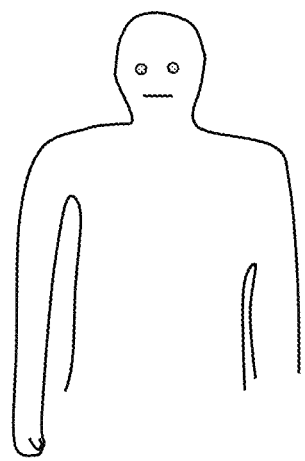
F I G. 7 A
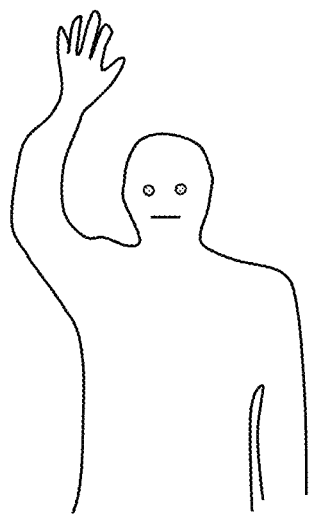
F I G. 7 B

ROTATION WITH JOINT AS CENTER

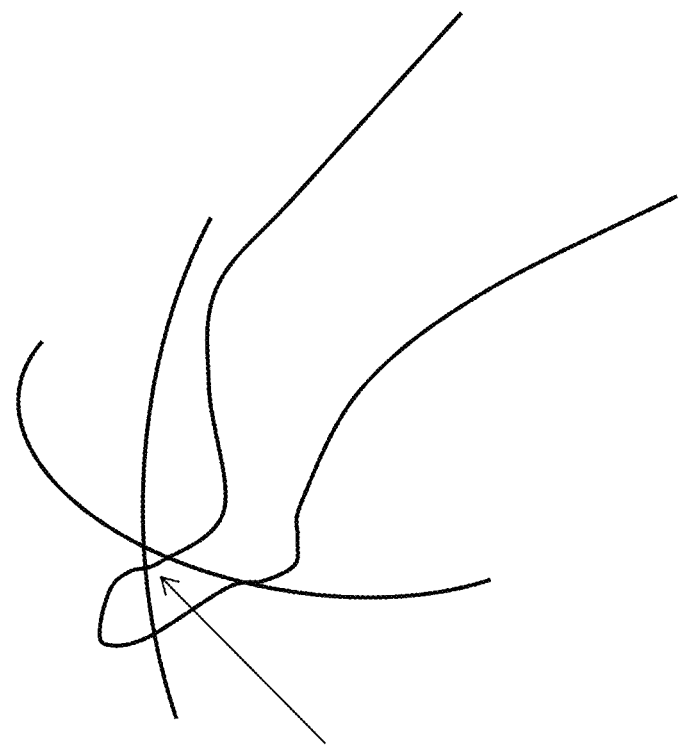
WITH ANKLE AS CENTER
F I G. 15

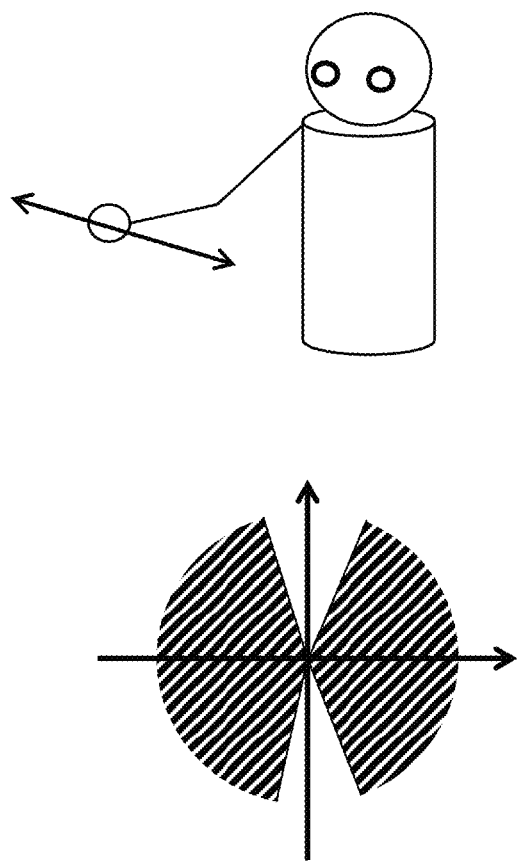
F I G. 19A

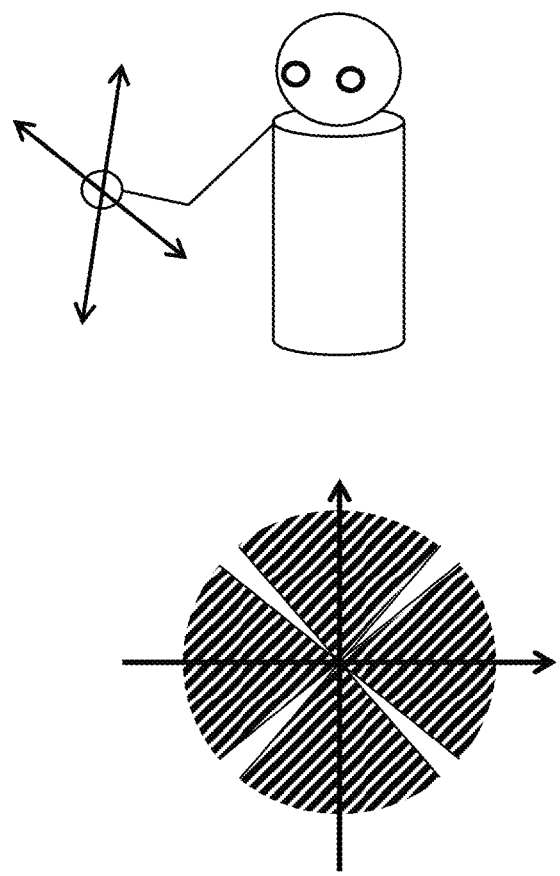
F I G. 19B

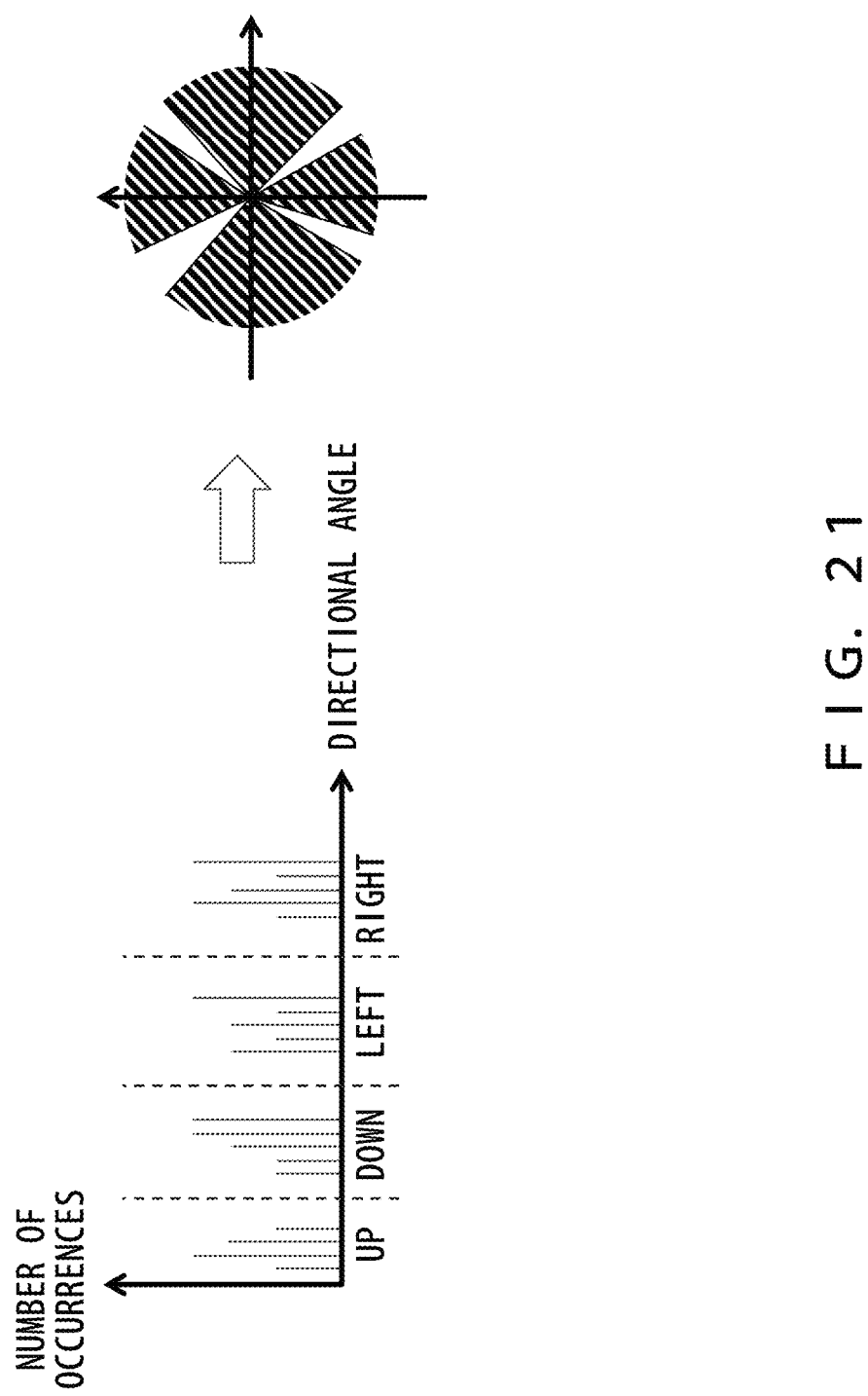
F I G. 21

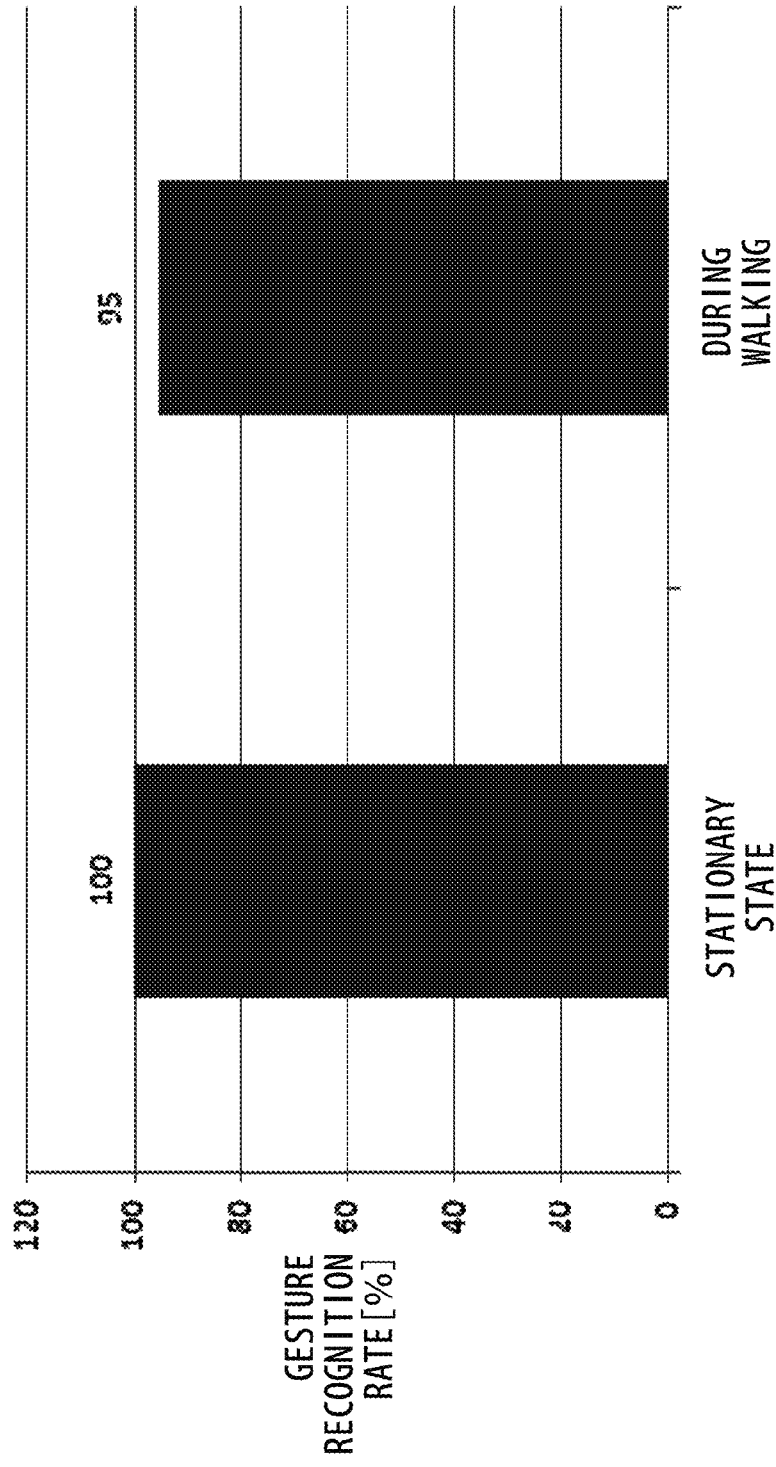
F I G. 22

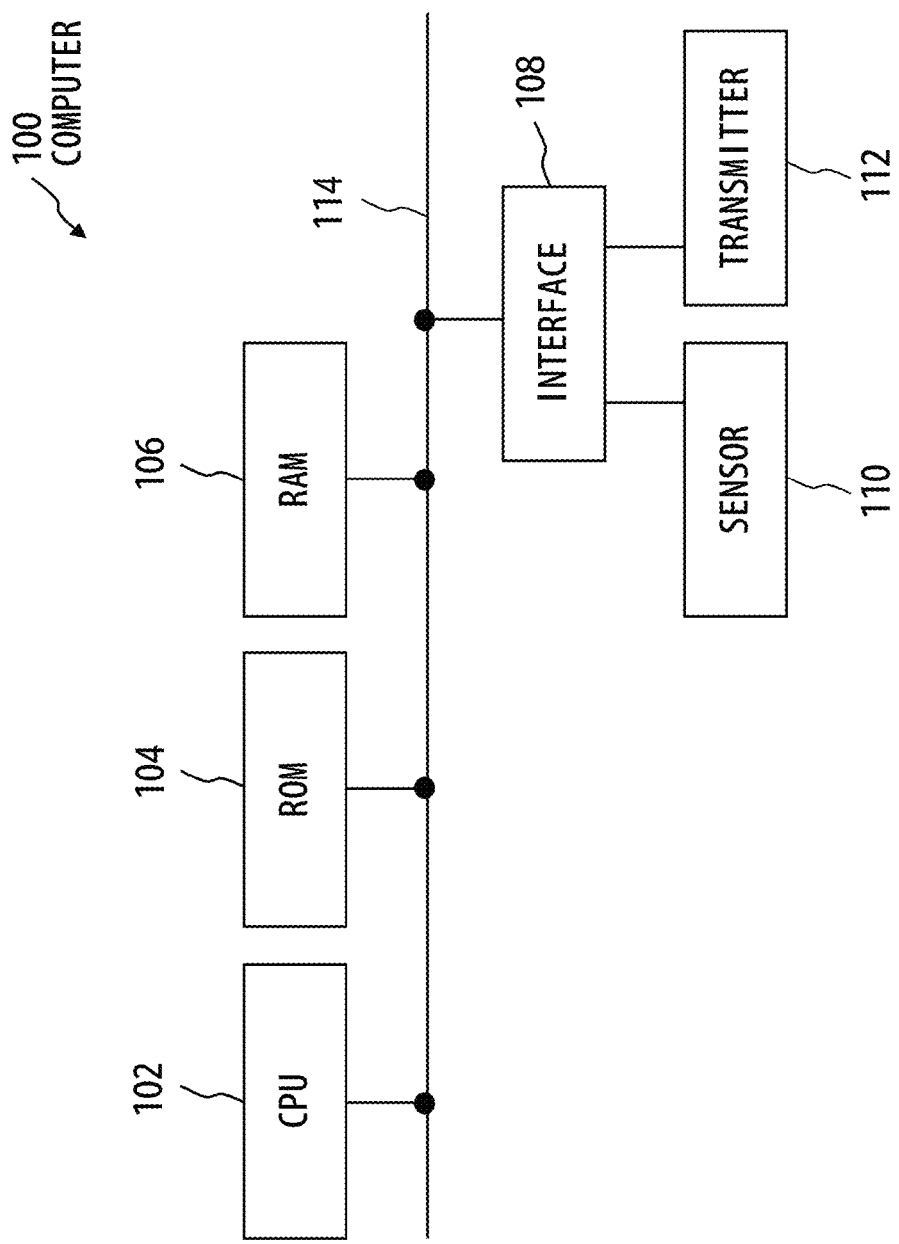
F I G. 23

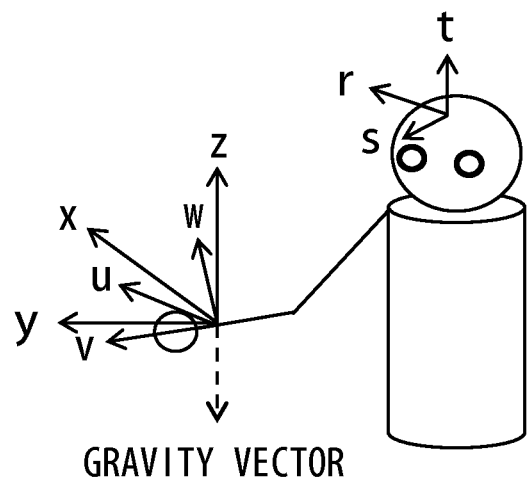
F I G. 27A
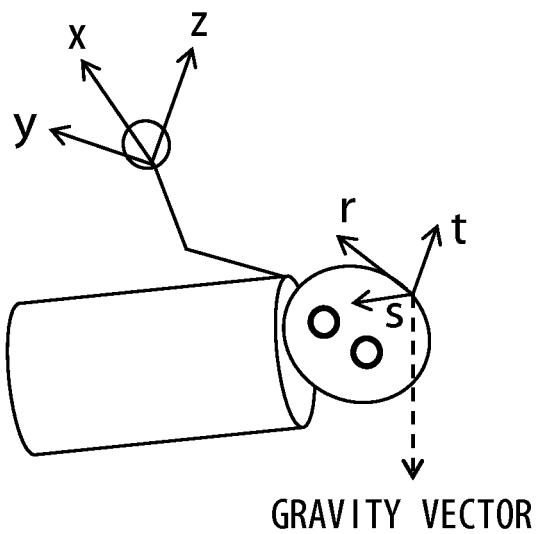
F I G. 27B

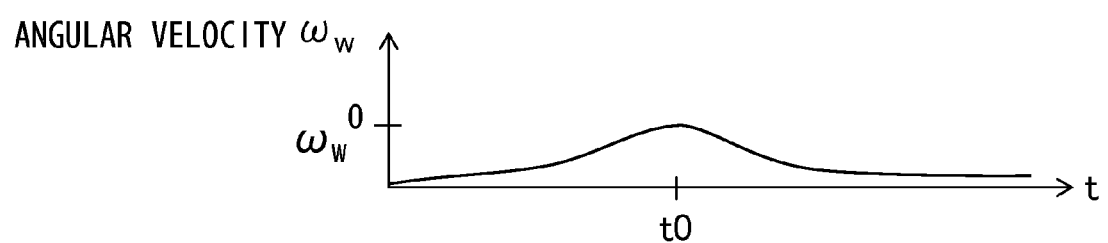
F I G. 3 1 A
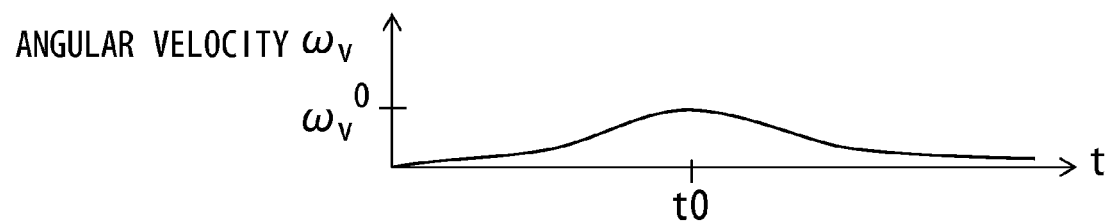
F I G. 3 1 B

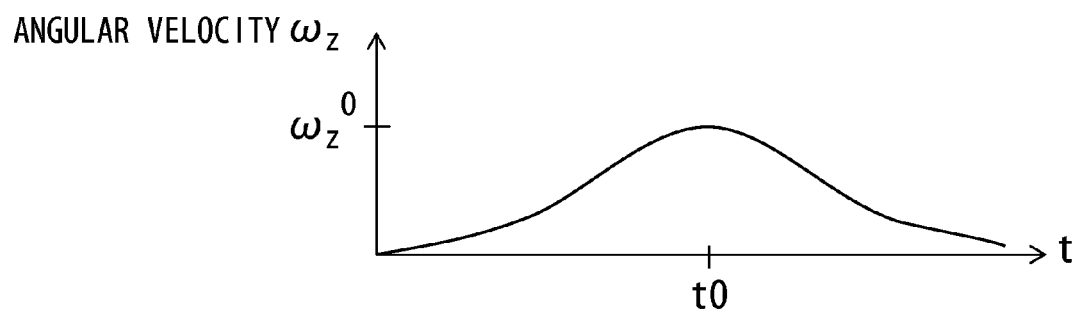
F I G. 3 2 A
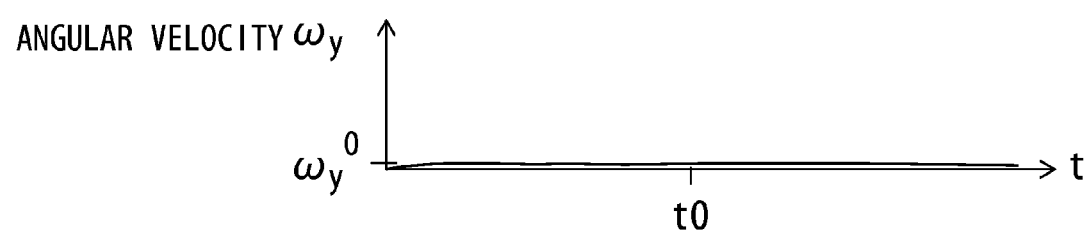
F I G. 3 2 B

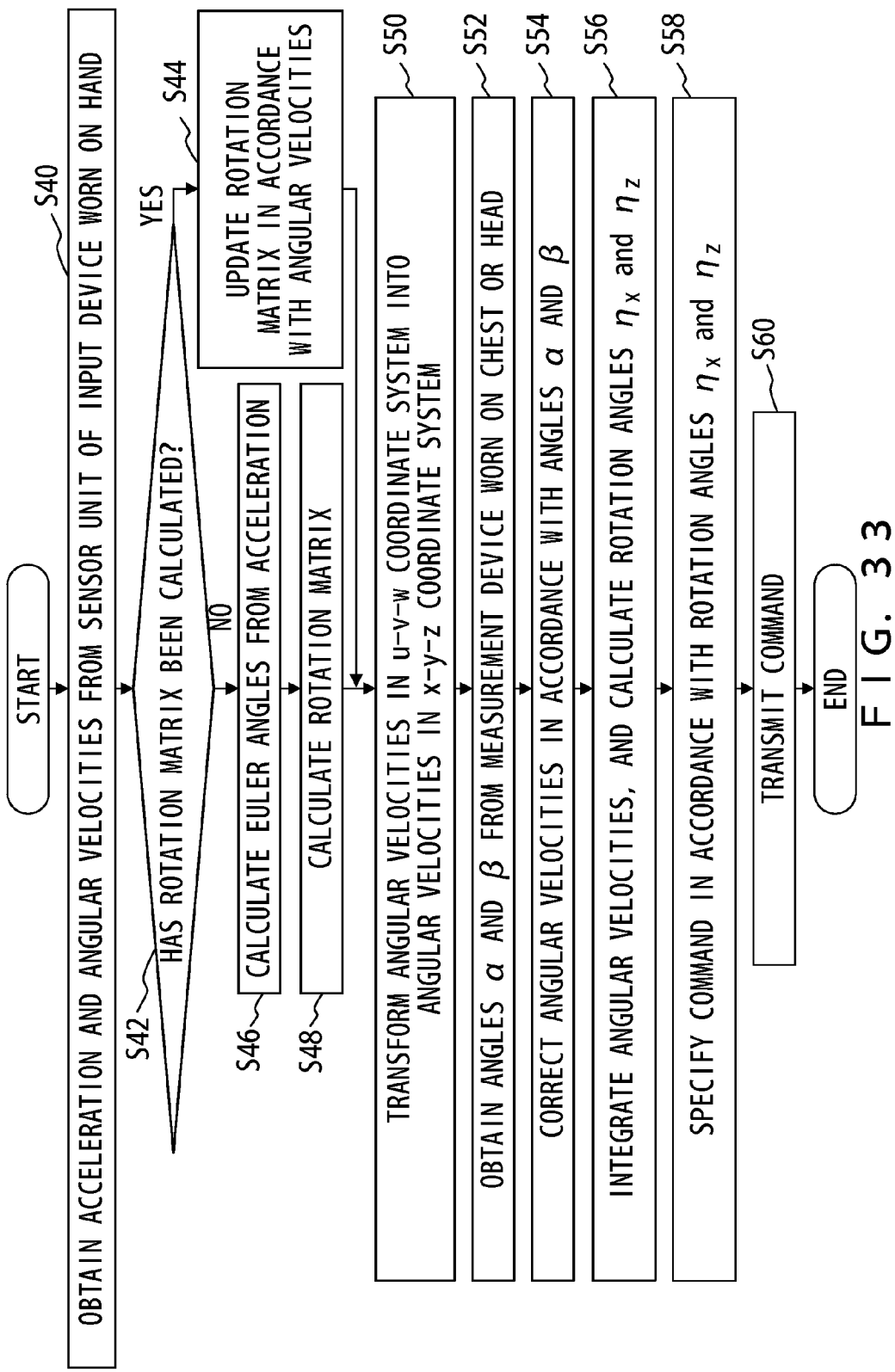
F I G. 33

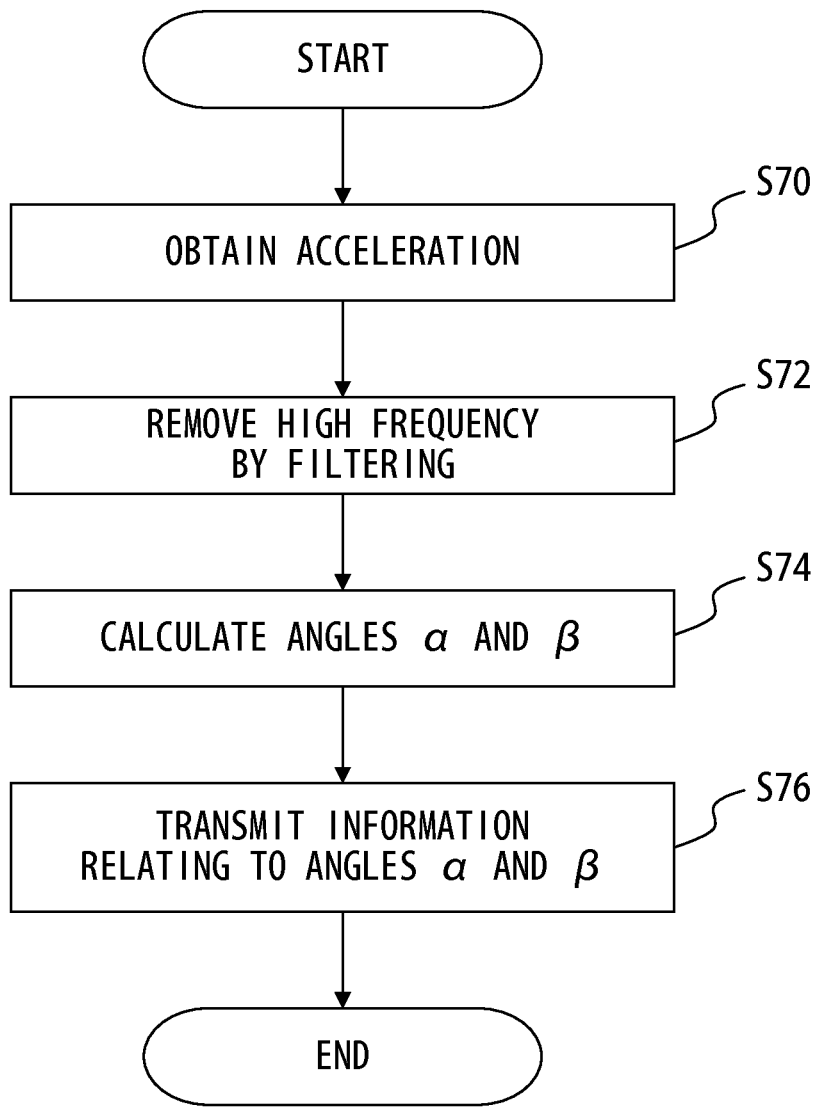
F I G. 3 4

INPUT DEVICE THAT IS WORN BY USER AND INPUT METHOD

CROSS-REFERENCE TO RELATED APPLICATIONS

This application is based upon and claims the benefit of priority of the prior Japanese Patent Application No. 2014-001987, filed on Jan. 8, 2014 and the prior Japanese Patent Application No. 2014-104322, filed on May 20, 2014, the entire contents of which are incorporated herein by reference.

FIELD

The embodiments discussed herein are related to an input device that is worn by a user and to an input method.

BACKGROUND

In order to operate a terminal using a touch panel, a user faces a screen on which output of the terminal is displayed, and operates the terminal by operating a keyboard or a mouse, or by touching the screen with one or more fingers. In other words, the user needs to directly touch the touch panel for the input into the terminal using the touch panel, and it is difficult for the user to operate the terminal from a free position of a hand or a free posture. In view of this, a method has been developed for operating a portable terminal or peripheral equipment using the movement of an upper limb, while wearing on one's body or holding in a hand a device that measures acceleration or angular velocity.

As the technology described above, a device is known that detects an angle corresponding to a change in orientation of a directional vector of a hand and a forearm of a user from an image obtained by capturing a user's movement, and that determines whether a motion to turn pages has been made (for example, Japanese Laid-open Patent Publication No. 2012-242901). In this technology, a user does not need to learn operations of a device for input, and can cause the device to perform corresponding control by merely making an ordinary motion to turn pages.

In addition, a technology is known for capturing an image of a position of a user's hand, expressing the position by a relative distance and a relative angle from a specified point, such as a center position of the user's chest, and associating the relative position and the relative angle with a position of a cursor of an input device (for example, Japanese National Publication of International Patent Application No. 2010-534895). This technology enables easy selection of an item from a group of items, such as the selection of a letter from a group of alphabetic letters, or the selection of a function from a plurality of functions.

In addition, a technology is known in which a user executes a game while holding a controller that is an operation device of a game machine, and re-specifies a reference posture of the controller by pressing a button of the controller (for example, International Publication Pamphlet No. 2011/122214). In this technology, the controller includes an angular velocity sensor, and outputs, to the game machine, a detection signal of an angular velocity detected by the angular velocity sensor. The detection signal of the angular velocity sensor is a signal that is obtained by detecting an angular velocity at which the controller is rotated around each of the coordinate axes of a three-dimensional orthogonal coordinate system that is generated in the controller. The game machine detects, from the detection signal, rotation angles from a reference posture of the controller, and performs control in accordance with a change in the rotation angle. This technology prevents, for example, a situation in which errors due to a drift of the angular velocity sensor are accumulated in an integrated value of angular velocities, the detected rotation angles become inaccurate over time, and it becomes impossible to appropriately control the movement of characters or objects that are displayed on a display of the game machine.

However, in a technology for detecting a position or a posture of an extremity of a body part that starts a motion, such as a hand, a toe, or a head, so as to perform input, a user's sense of direction deviates from corresponding operations. Therefore, there is a problem wherein the user feels unconformable and is likely to require a significant effort to learn operations. In addition, in a method for calculating a posture angle from an acceleration during a motion, there is a problem wherein an error due to noise is likely to occur.

SUMMARY

According to an aspect of the embodiments, an input device, that is worn on a portion of a user's body, includes: a sensor unit configured to obtain angular velocities and an acceleration in a first coordinate system fixed in the input device; a reference posture specification unit configured to generate a second coordinate system for a reference posture of the user; a rotation matrix calculator configured to calculate a rotation matrix that transforms the angular velocities in the first coordinate system into angular velocities in the second coordinate system using the acceleration in the first coordinate system; a characteristic value calculator configured to calculate characteristic values in the second coordinate system using the angular velocities in the second coordinate system; a command specification unit configured to specify a command according to the characteristic values; and a transmitter configured to transmit the command to the controller.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an exemplary configuration of an input device according to a first embodiment.

FIG. 3 illustrates an example of classification of body parts.

FIG. 7A illustrates an example of a posture in which a person puts his or her hands down.

FIG. 7B illustrates an example of a posture in which a person raises a hand.

FIG. 15 illustrates an example of a coordinate system generated in an ankle.

FIG. 19A illustrates an example of a relationship between a motion and a command in a case of two options.

FIG. 19B illustrates an example of a relationship between a motion and a command in a case of four options.

FIG. 20 and FIG. 21 are diagrams explaining optimization of a relationship between a motion and a command for a user.

FIG. 22 illustrates an example of a gesture recognition rate.

FIG. 23 illustrates an example of a configuration of an input device.

FIG. 27A illustrates an example of an orthogonal coordinate system for a reference posture.

FIG. 27B illustrates an example of an orthogonal coordinate system for a posture that deviates from the reference posture.

FIGS. 31A and 31B illustrate examples of a temporal change in an angular velocity that is measured when a user's hand is rotated around an axis of the user's body.

FIGS. 32A and 32B illustrate examples of a temporal change in a corrected angular velocity when a user's hand is rotated around an axis of the user's body.

FIG. 33 illustrates an example of a processing flow of the input device according to the second embodiment.

FIG. 34 illustrates an example of a processing flow of a measurement device according to the second embodiment.

DESCRIPTION OF EMBODIMENTS

Figure 2:
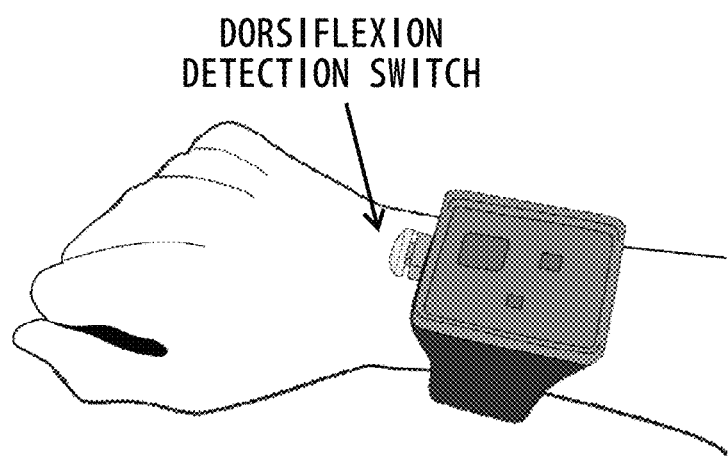
FIG. 2 illustrates an example of a dorsiflexion detection switch that specifies a reference posture.

With reference to the drawings, a wearable input device and an input method according to embodiments are described below.

First Embodiment

Input Device

FIG. 1 illustrates an outline of an information processing device 10. The information processing device 10 includes an input device 20 and a controller 30. Examples of the information processing device 10 are a general-purpose personal computer, a game machine, equipment for business support or entertainment, a diagnostic device for a person's health condition or physical condition, and the like.

In the example of FIG. 1, the input device 20 is worn around the right wrist of a user. As illustrated in FIG. 1, the input device 20 includes a sensor unit 202, a reference posture specification unit 204, a rotation matrix calculator 206, a characteristic value calculator 208, a command specification unit 210, and a transmitter 212.

Further, the input device 20 includes a sensor unit 22, a micro processing unit (MPU) 24, a communicator 26, a fixture 28, and a reference posture specification switch 29. The reference posture specification switch 29 of the input device 20 is used for specifying a reference posture. In addition, as illustrated in FIG. 2, the reference posture specification switch 29 may be a dorsiflexion detection switch 29. The dorsiflexion detection switch can be pressed by bending a user's wrist toward the back of the user's hand. When the dorsiflexion detection switch is pressed, a reference posture may be specified. In addition, a user's posture at a time when a specified time period, such as two seconds or five seconds, has passed after pressing the dorsiflexion detection switch 29 may be specified to be a reference posture.

The reference posture specification unit 204, the rotation matrix calculator 206, the characteristic value calculator 208, and the command specification unit 210 are configured by the MPU 24 and a computer program for controlling the MPU 24. In addition, the communicator 26 configures the transmitter 212.

As illustrated in FIG. 3, body parts are classified into a "head portion", an "arm portion", and a "leg portion". The head portion may include a portion above the neck, and a portion from the neck to the abdomen. The arm portion is the arm below a shoulder. The leg portion is the leg below a hip joint.

In the embodiments described below, the input device 20 provided with a triaxial angular velocity sensor and a triaxial acceleration sensor is held in a user's hand or is worn around a user's wrist, a characteristic value is calculated that corresponds to a movement of an upper limb regardless of a wrist position or posture at a start time, and a command for controlling a device is selected in accordance with the characteristic value. Of course, another auxiliary characteristic value may be used simultaneously as needed.

The sensor unit 22 (sensor unit 202) obtains an angular velocity and an acceleration. The sensor unit 22 (sensor unit 202) may include an angular velocity sensor and an acceleration sensor. The description below is given using an example in which the sensor unit 22 includes both the angular velocity sensor and the acceleration sensor; however, the sensor unit 22 does not need to include both the angular velocity sensor and the acceleration sensor, if either of the sensors has all of the functions described below. Alternatively, an angular velocity sensor and/or an acceleration sensor may be provided separately from the input device 20, and the sensor unit 22 may obtain an angular velocity and an acceleration from the angular velocity sensor and/or the acceleration sensor. In this case, the angular velocity sensor and/or the acceleration sensor may be worn on a portion of a body separate from the input device 20, such as a wrist or an ankle, and the input device 20 may be put into a chest pocket of user's clothing, or may be attached to a belt or suspenders.

The sensor unit 22 (202) may obtain an angular velocity and an acceleration from sensors other than the angular velocity sensor and the acceleration sensor. As an example, the sensor unit 22 (202) may be configured using at least one of a gyro sensor, an electronic compass, a camera, a muscle potential sensor, and the like.

The micro processing unit (MPU) 24 generates an input command using an angular velocity and an acceleration detected by the sensor unit 22.

Figure 4:
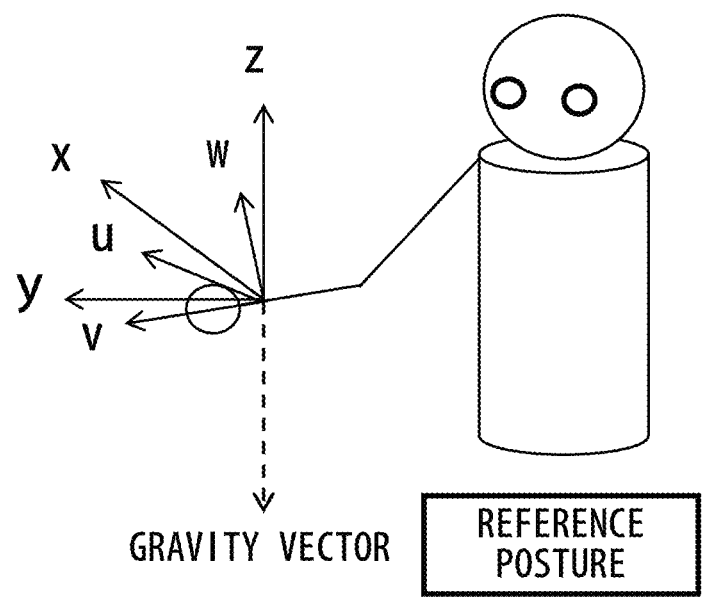
FIG. 4 illustrates an example of an orthogonal coordinate system generated for the reference posture.

As illustrated in FIG. 4, the reference posture specification unit 204 first generates an orthogonal coordinate system x-y-z for a reference posture by using a posture at the time of starting a motion as a reference posture. Examples of a timing at which a reference posture is specified include a timing at which a user's body enters into a specified joint posture or physiological state, a timing at which a user finishes a specified body motion, a timing at which a user performs a specified operation on a device, and other timings.

Examples of a timing at which a user's body enters into a specified joint posture or physiological state include a timing at which a dorsiflexion angle exceeds a reference value, a timing at which lips are separated from each other, a timing at which a first is clenched, and a timing at which a heart rate exceeds a reference value. In order to determine whether a user's body has entered into a specified joint posture or physiological state, the sensor unit 22 (202) may be provided with a sensor that measures a dorsiflexion angle or a sensor that measures a heart rate. In addition, the input device 20 may receive, from outside, data needed for determining whether a user's lips are separated from each other or whether a user is clenching his or her fist. As an example, the input device 20 may receive an image of a user. Alternatively, the input device 20 may perform the determinations as described above using items of measurement data from an angular velocity sensor and an acceleration sensor.

Examples of a timing at which a user finishes a specified body motion include a timing at which a user draws two or more circles using a hand, a timing at which a first is clenched three times or more, a timing at which eyes are closed for three seconds or more, and other timings. The input device 20 may receive, from outside, data needed for determining whether a user is performing the motions as described above. As an example, the input device 20 may receive an image of a user. Alternatively, the input device 20 may perform the determination as described above using items of measurement data from an angular velocity sensor and an acceleration sensor.

Examples of a timing at which a user performs a specified operation on a device include a timing at which a switch is pressed, a timing at which a dial is rotated up to a specified position, and a timing at which a voltage that exceeds a reference value is applied to the device. In particular, when the reference posture specification switch 29 of the input device 20 is pressed, a reference posture may be specified. Note that the reference posture specification switch 29 of the input device 20 may be a switch for inputting a timing of performing reference setting.

If a coordinate system fixed in a device that is held in a hand or is worn around a wrist is assumed to be a coordinate system u-v-w, z axis is an axis that passes through the origin of the coordinate system u-v-w, and that is parallel to a gravity vector and has a direction opposite to that of the gravity vector. X axis is an axis that passes through the origin of the coordinate system u-v-w, and that is orthogonal to the z axis and a v axis. Y axis is an axis that passes through the origin of the coordinate system u-v-w, and that is orthogonal to the z axis and the x axis. In this case, the x and y axes are on a horizontal plane, regardless of an inclination of the u and w axes with respect to the gravity vector (a twist of an arm).

The rotation matrix calculator 206 respectively calculates Euler angles $\theta$, $\psi$, and $\phi$ around the x, y, and z axes of the u-v-w coordinate system (also referred to as a first coordinate system) with respect to an x-y-z coordinate system (also referred to as a second coordinate system) from a value of the acceleration sensor of the sensor unit 22.

Figure 5:
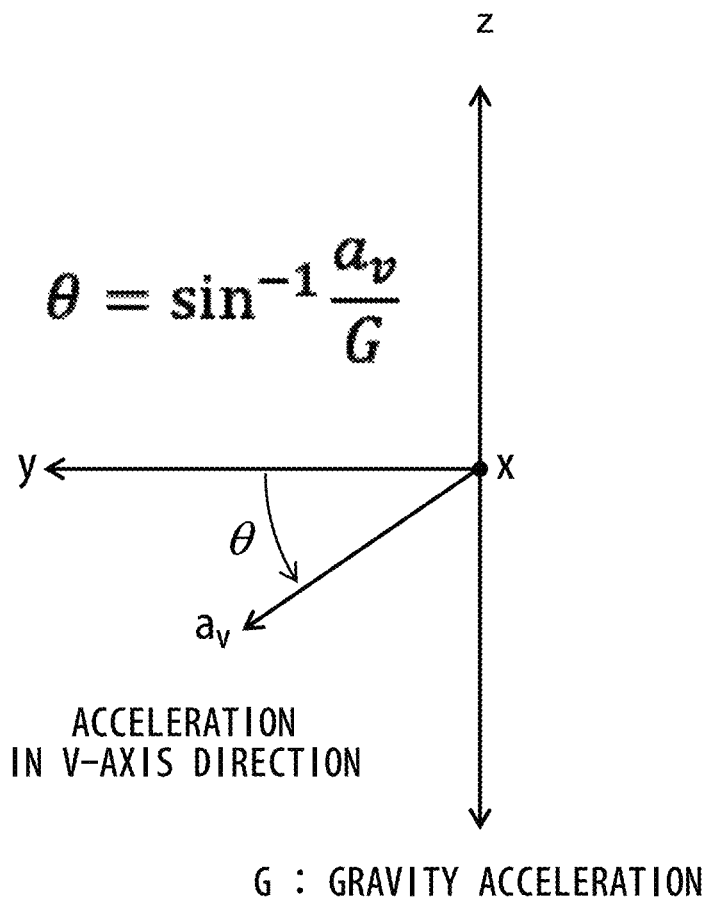
FIG. 5 is a diagram explaining a Euler angle $\theta$.

FIG. 5 is a diagram explaining the Euler angle $\theta$. An observation value of the acceleration sensor includes a gravity acceleration and an inertia acceleration (an acceleration due to movement). Assuming that a device is stationary in a reference posture, the observation value matches the gravity acceleration when a user is in the reference posture. When the observation value does not match the gravity acceleration, only gravity acceleration components are calculated, using a low-pass filter. Here, u, v, and w components of the gravity acceleration are assumed to be au, av, and aw, respectively.

An orientation of a gravity acceleration G is made to match a negative direction of the z axis. The Euler angle $\theta$ around the x axis of the u-v-w coordinate system with respect to the x-y-z coordinate system is defined by the following expression:

$$\theta = \sin^{-1} \frac{a_v}{G}$$

Figure 6:
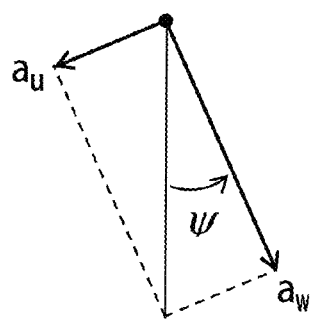
FIG. 6 is a diagram explaining a Euler angle $\psi$.

FIG. 6 is a diagram explaining the Euler angle $\psi$. Here, u and w components of a gravity acceleration are assumed to be au and aw, respectively. The Euler angle $\psi$ around the y axis of the u-v-w coordinate system with respect to the x-y-z coordinate system is defined by the following expression:

$$\psi = \tan^{-1} \frac{a_u}{a_w}$$

The Euler angle $\phi$ around the z axis of the u-v-w coordinate system with respect to the x-y-z coordinate system is always 0 in the reference posture.

The rotation matrix calculator 206 may determine the Euler angles $\theta$, $\psi$, and $\phi$ by one calculation, or may obtain the Euler angles $\theta$, $\psi$, and $\phi$, for example, by averaging a plurality of calculations.

When the Euler angle $\theta$ is near ±90°, both au and aw are minute, and therefore it may be impossible to accurately calculate the Euler angle $\phi$ in some cases.

Figure 8:
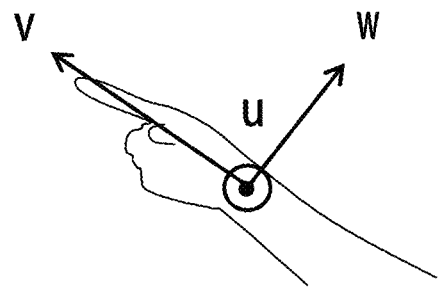
FIG. 8 illustrates an example of the setting of a Euler angle $\psi$.

However, as illustrated in FIGS. 7A and 7B, palms are likely to be in contact with one's body when one's hands are naturally put down, and palms are directed outward when one's hands are raised, because of the characteristics of a human body. FIG. 7A illustrates an example of a posture in which a person puts his or her hands down. FIG. 7B illustrates an example of a posture in which a person raises a hand. As illustrated in FIG. 7A, generally, palms are likely to be facing the thighs when a person naturally puts his or her hands down. In addition, as illustrated in FIG. 7B, generally, a palm is likely to be facing forward from a body when a person raises his or her hand. Therefore, when θ exceeds a threshold value, ψ is set as illustrated in FIG. 8. In other words, when θ=±90°, ψ=+90° is established.

In addition, the rotation matrix calculator 206 calculates a rotation matrix R that transforms angular velocities in the u-v-w coordinate system into angular velocities in the x-y-z coordinate system from the Euler angles θ, ψ, and φ. At this time, a posture of a wrist is changed in accordance with a motion of an upper limb, and therefore the rotation matrix R is updated using periodically obtained values of the angular velocity sensor.

The rotation matrix R is defined by the following expression using the Euler angles θ, ψ, and φ:

$$R = \begin{bmatrix} 1 & 0 & 0 \\ 0 & \cos\theta & -\sin\theta \\ 0 & \sin\theta & \cos\theta \end{bmatrix} \begin{bmatrix} \cos\psi & 0 & \sin\psi \\ 0 & 1 & 0 \\ -\sin\psi & 0 & \cos\psi \end{bmatrix} \begin{bmatrix} \cos\phi & -\sin\phi & 0 \\ \sin\phi & \cos\phi & 0 \\ 0 & 0 & 1 \end{bmatrix}$$

Figure 9:
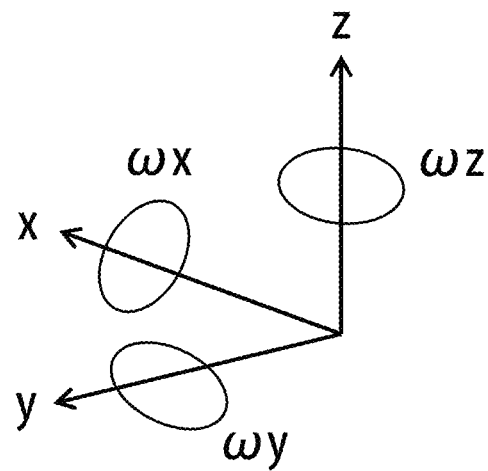
FIG. 9 is a diagram explaining rotation matrix elements $\omega x$, $\omega y$, and $\omega z$.

FIG. 9 is a diagram explaining rotation matrix elements ωx, ωy, and ωz. Angular velocities around the x, y, and z axes are assumed to be ωx, ωy, and ωz, respectively, and angular velocities around the u, v, and w axes are assumed to be ωu, ωv, and ωw, respectively. The transformation of ωu, ωv, and ωw into ωx, ωy, and ωz is expressed by the following:

$$\begin{bmatrix} \omega_x \\ \omega_y \\ \omega_z \end{bmatrix} = R \begin{bmatrix} \omega_u \\ \omega_v \\ \omega_w \end{bmatrix}$$

The rotation matrix calculator 206 appropriately updates the rotation matrix R. A method for obtaining a posture according to a gravity acceleration is likely to be affected by noise or an inertia acceleration during motion. In view of this, the rotation matrix R is updated in accordance with angular velocities of respective axes.

In a method for updating Euler angles and re-calculating a rotation matrix R, for example, the following is performed. Angular velocities at the time of time t=n*dt are assumed to be ωx(n), ωy(n), and ωz(n), respectively. Note that the symbol "*" denotes a multiplication. Euler angles at the time of time t=n*dt are assumed to be θ(n), ψ(n), and φ(n), respectively. Similarly, Euler angles at the time of time t=(n−1)*dt are assumed to be θ(n−1), ψ(n−1), and φ(n−1), respectively. Here, dt is a sampling cycle, i.e., a time difference between a time of obtaining previous angular velocities and a time of obtaining current angular velocities. The Euler angles θ(n), ψ(n), and φ(n) at the time of time t=n*dt are obtained by the following expression:

$$\begin{bmatrix} \theta(n) \\ \psi(n) \\ \phi(n) \end{bmatrix} = \begin{bmatrix} \theta(n-1) \\ \psi(n-1) \\ \phi(n-1) \end{bmatrix} + \begin{bmatrix} \omega_x(n) \\ \omega_y(n) \\ \omega_z(n) \end{bmatrix} dt$$

A rotation angle ηx around the x axis and a rotation angle ηz around the z axis are respectively defined by the following expressions:

$$\eta_x = \int dt \cdot \omega_x$$

$$\eta_z = \int dt \cdot \omega_z$$

Figure 10:
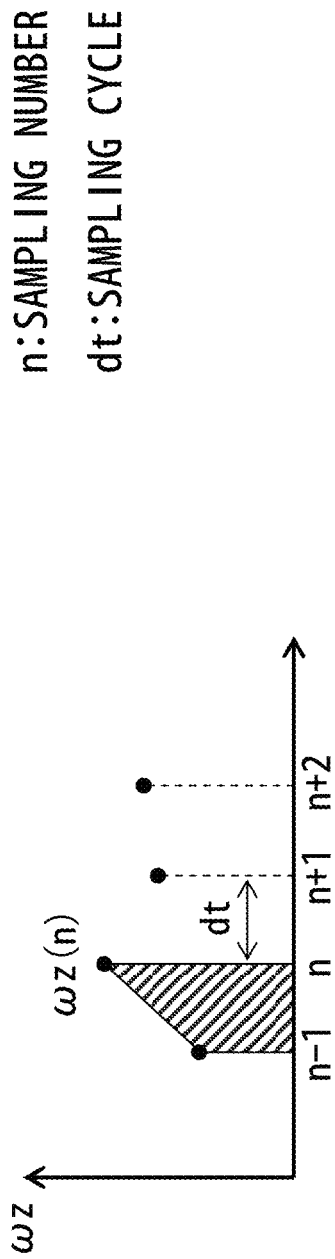
FIG. 10 is a diagram explaining the integral of a rotation angle ηz.

The formulae are defined in a discrete system by the following:

$$\eta_x = \eta_x(0) + \sum \frac{(\omega_x(n) + \omega_x(n-1)) \cdot dt}{2}$$

$$\eta_z = \eta_z(0) + \sum \frac{(\omega_z(n) + \omega_z(n-1)) \cdot dt}{2}$$

where ηx(0) and ηz (0) are initial values. FIG. 10 is a diagram explaining the integral of the rotation angle ηz. The second term on the right side of the above expression expresses a shaded portion in FIG. 10.

Figure 11:
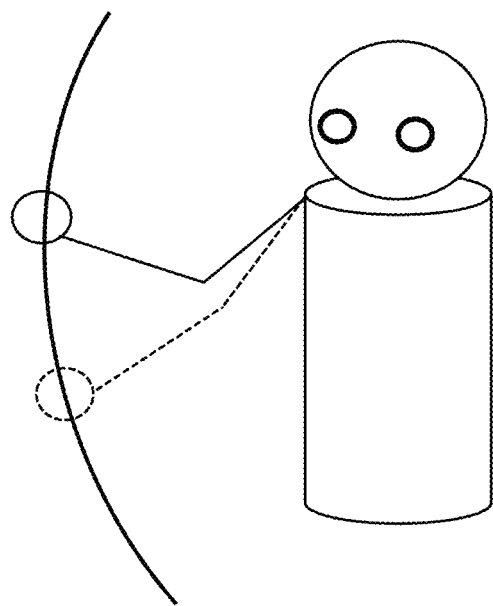
FIG. 11 is a diagram explaining a rotation angle ηx.
Figure 12:
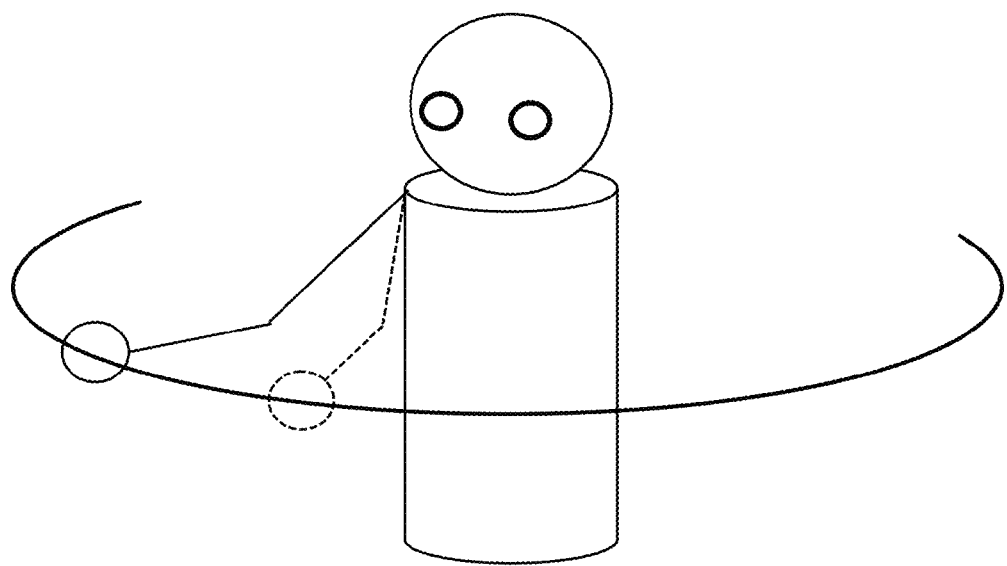
FIG. 12 is a diagram explaining a rotation angle ηz.

FIG. 11 is a diagram explaining the rotation angle ηx. FIG. 12 is a diagram explaining the rotation angle ηz. As illustrated in FIG. 11, the rotation angle ηx is generated by a motion of rotating a user's arm around the x axis extending in a direction vertical to a body axis. As illustrated in FIG. 12, the rotation angle ηz is generated by a motion of moving a user's arm within a horizontal plane.

Figure 13:
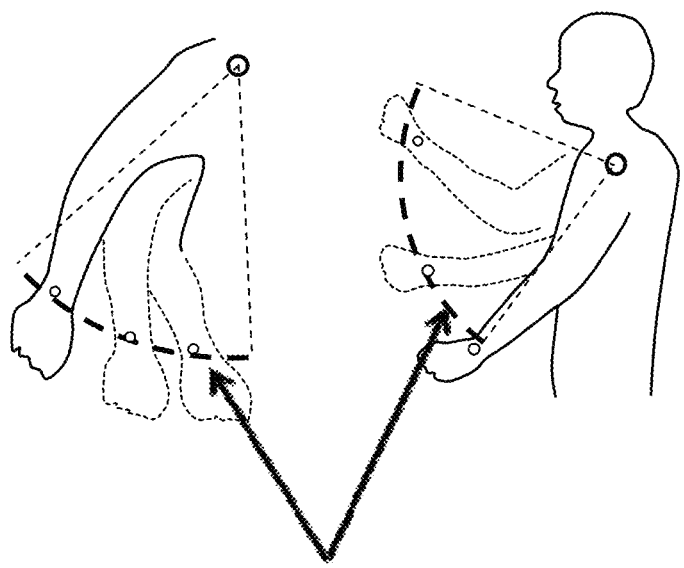
FIG. 13 illustrates an example of a rotation with a joint as the center.
Figure 14:
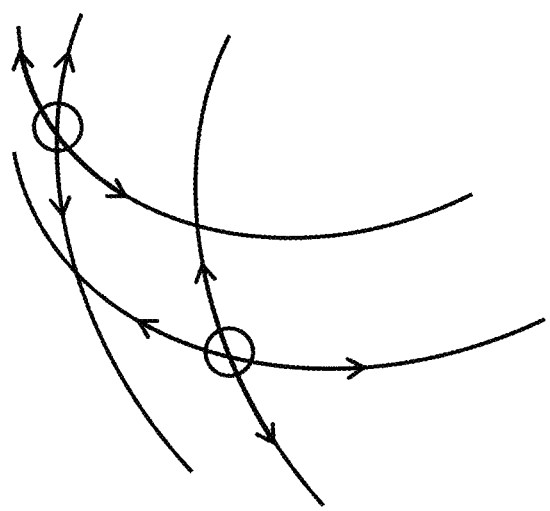
FIG. 14 illustrates a motion of FIG. 13 in an orthogonal coordinate system for a reference posture.

FIG. 13 illustrates an example of a rotation with a joint as the center. FIG. 14 illustrates a motion of FIG. 13 in an orthogonal coordinate system in a reference posture.

In order to measure a motion of an upper limb of a person, the input device 20 is worn around a user's wrist, and the wrist is moved in natural vertical and horizontal directions. It is assumed to be clear that, as a result, a rotation around the x axis corresponds to a vertical motion, as illustrated in FIG. 11, and that a rotation around the z axis corresponds to a horizontal motion. When the x-y-z coordinate system is defined for the reference posture, the rotations around the x axis and the z axis can be made to sensitively match vertical and horizontal motions of a person, no matter where a motion is started.

Figure 16:
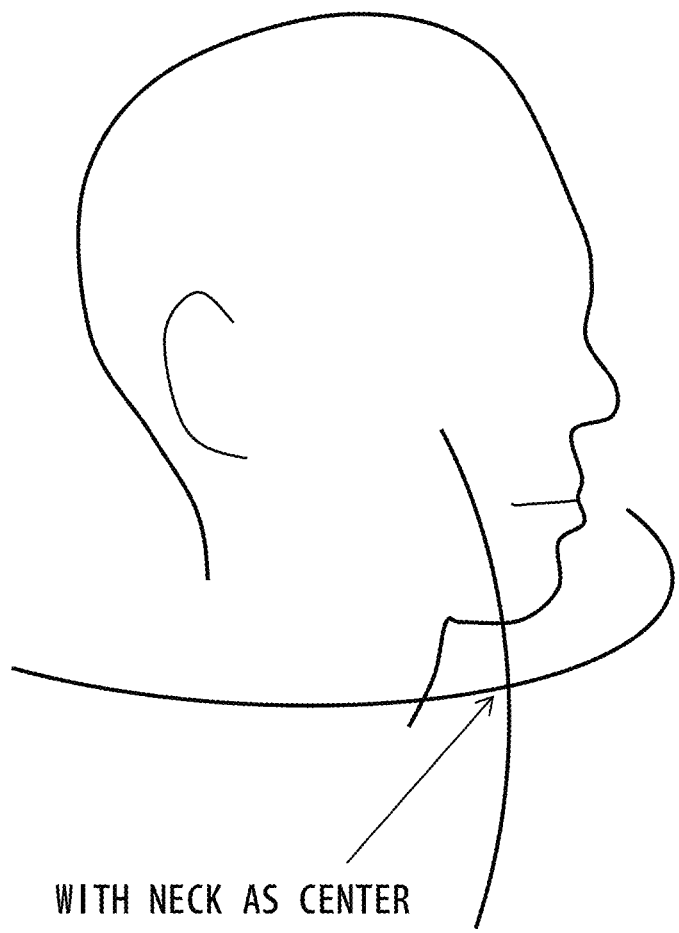
FIG. 16 illustrates an example of a coordinate system generated in a neck.

In the above example, the input device 20 is worn on an arm, but a body part on which the input device 20 is worn is not limited to an arm. As an example, the input device 20 may be worn on an ankle, as illustrated in FIG. 15, or may be worn on the head, as illustrated in FIG. 16.

The characteristic value calculator 208 integrates angular velocities that have been transformed into angular velocities in an x-y-z coordinate system, calculates rotation angles ηx and ηz respectively around the x axis and the z axis, and defines the rotation angles to be characteristic values.

In the above example, a user's motion is measured by a measurement device 20 worn around a wrist of the user, and rotation angles ηx and ηz around the x axis and the z axis are calculated as characteristic values. However, an amount referred to as an auxiliary characteristic value may be detected in addition to the rotation angles ηx and ηz, and may be used for the specification of a command.

Figure 17:
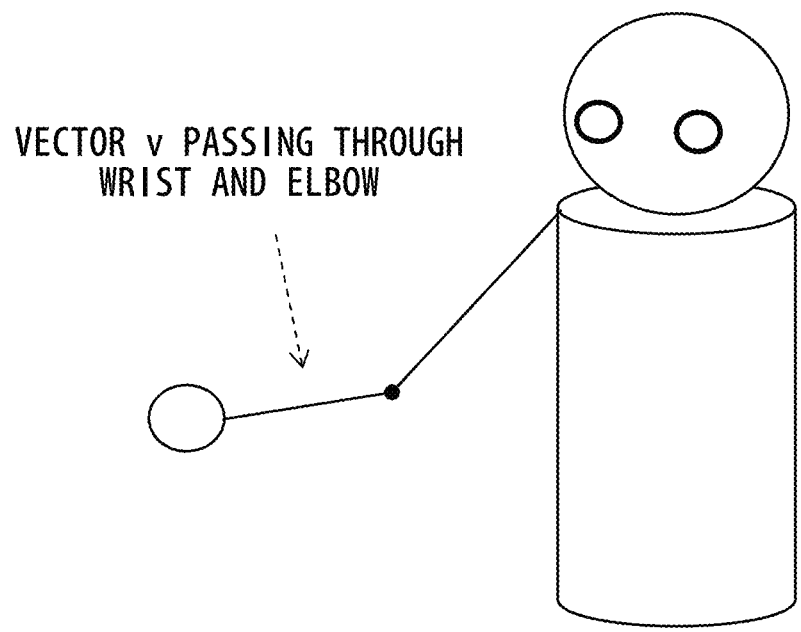
FIG. 17 illustrates a vector passing through a wrist and an elbow as an example of an auxiliary characteristic value.

Examples of an auxiliary characteristic value include the following:

(1) A movement amount of a wrist in a direction of a vector v, or a temporal change (velocity or acceleration) thereof
(2) An angle at which a wrist is twisted, or a temporal change thereof
(3) Clenching or unclenching of a first
(4) An angle of a wrist or a temporal change thereof
(5) An ON/OFF operation of a switch
(6) An analog operation amount of a dial, a bending sensor, or the like, or a temporal change thereof FIG. 17 illustrates a vector passing through a wrist and an elbow as an example of an auxiliary characteristic value.

The command specification unit 210 specifies a command for operating equipment according to characteristic values calculated by the characteristic value calculator 208. As an example, when the information processing device 10 is a "karaoke" machine, the command specification unit 210 may assign a command to an operation of turning up and down the sound volume of equipment or an operation of selecting a song, using an index α as expressed by the expression below, relating to a ratio of the rotation angles ηx and ηz:

$$\alpha = \tan^{-1}\left(\frac{\eta_x}{\eta_z}\right)$$

The rotation angles ηx and ηz may be associated with mouse cursor positions using variable transformation such that a cursor of a personal computer can be operated using an upper limb motion. Handwritten characters may be recognized using loci of the rotation angles ηx and ηz. Further, as an example, image magnification/reduction and image rotation may be performed in accordance with the rotation angles ηx and ηz, respectively.

Figure 18:
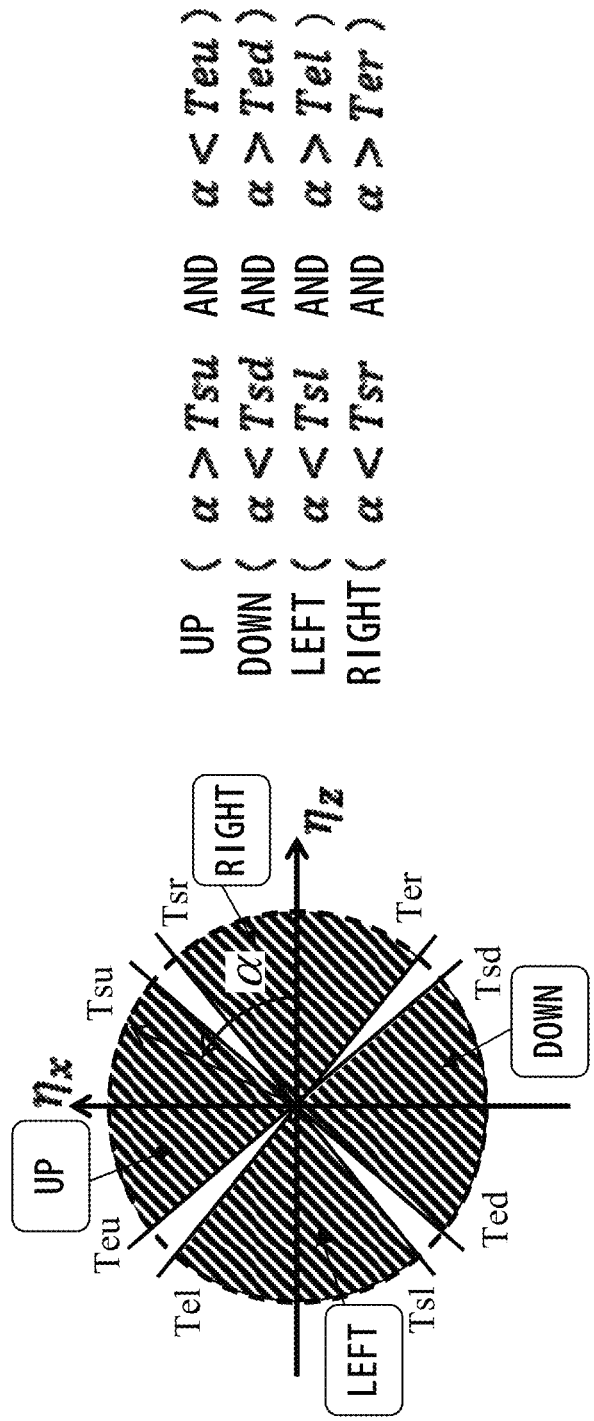
FIG. 18 illustrates an example of a relationship between a motion and a command.

FIG. 18 illustrates an example of a relationship between a motion and a command. In the example illustrated in FIG. 18, one of the commands "left", "right", "up", and "down" is specified in accordance with the index α that represents a ratio of the rotation angles ηx and ηz.

As an example, when the index α is more than Tsu and is less than Teu, the command specification unit 210 may associate an upper limb motion with an "up" command. When the index α is less than Tsd and is more than Ted, the command specification unit 210 may associate the upper limb motion with a "down" command. When the index α is less than Tsl and is more than Tel, the command specification unit 210 may associate the upper limb motion with a "left" command. When the index α is less than Tsr and is more than Ter, the command specification unit 210 may associate the upper limb motion with a "right" command.

Figure 19C:
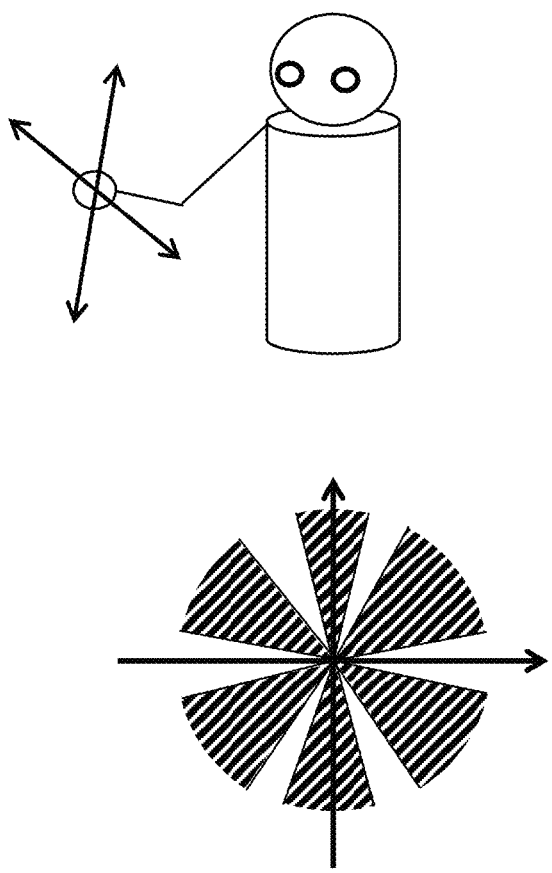
FIG. 19C illustrates an example of a relationship between a motion and a command in a case of six options.

FIG. 19A illustrates an example of a relationship between a motion and a command in a case of two options. FIG. 19B illustrates an example of a relationship between a motion and a command in a case of four options. FIG. 19C illustrates an example of a relationship between a motion and a command in a case of six options.

In a case of two alternatives as illustrated in FIG. 19A, one of the two options may be determined by whether a wrist around which the input device 20 is worn is moved leftward or rightward. In the lower diagram of FIG. 19A, a vertical axis and a horizontal axis may indicate rotation angles ηx and ηz, respectively.

In FIG. 19A, an ηx-ηz plane excluding the vicinity of a rotation angle ηz of 0[deg] is divided into two regions. Commands for controlling the controller 30 are assigned to the respective divided regions.

In cases of four and six options as illustrated in FIG. 19B and FIG. 19C, one of the options may be selected in accordance with a value of the index α. In the lower diagrams of FIG. 19B and FIG. 19C, vertical axes and horizontal axes may indicate rotation angles ηx and ηz, respectively.

In FIG. 19B, the ηx-ηz plane is divided into four regions. In FIG. 19C, the ηx-ηz plane is divided into six regions. Commands for controlling the controller 30 are assigned to the respective divided regions.

Note that the number of options may be dynamically changed in accordance with a controlled object, a reference posture, a current posture, the distribution of angular velocities, or the like.

Figure 20:
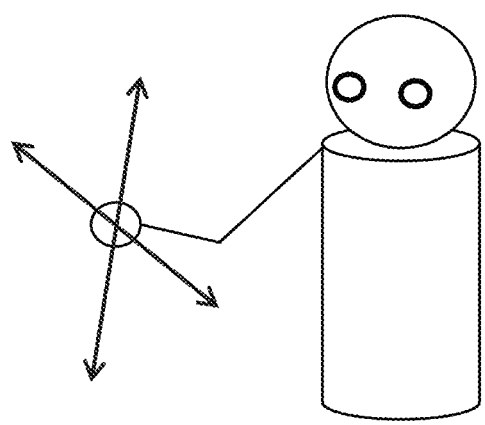

FIG. 20 and FIG. 21 are diagrams explaining optimization of a relationship between a motion and a command for a user. As illustrated in FIG. 20, a correspondence between a direction and a movement of a user can be learnt by making a user move his or her wrist in an instructed direction from among leftward, rightward, upward, and downward directions. Then, as illustrated in FIG. 21, directional angles in movements in the respective directions may be calculated so as to determine optimum threshold values in accordance with calculation results. As a result, threshold values that are suitable for a tendency of the movement of a specific user can be prepared. In FIGS. 19A-19C, for example, the divided regions have almost the same size as each other. However, the command specification unit 210 may divide the ηx-ηz plane non-uniformly.

FIG. 21 is a diagram explaining a method for dividing the ηx-ηz plane non-uniformly. A frequency of each posture of a user may be detected by counting the number of occurrences at each directional angle, and the ηx-ηz plane may be divided non-uniformly in accordance with the distribution of the numbers of occurrences.

FIG. 22 illustrates an example of a gesture recognition rate during walking. In the example illustrated in FIG. 22, four types of gestures, i.e., up, down, left, and right, are respectively performed five times; in other words, twenty trials in total are performed. As illustrated in FIG. 22, a recognition rate in a stationary state is 100 percents. In addition, a recognition rate during walking is 95 percents, which is very high.

As described above, the command specification unit 210 of the input device 20 specifies a command according to the output of the sensor unit 202 (that is, motion of a user). Then the transmitter 212 transmits the specified command to the controller 30. Note that the input device 20 may be worn on a portion of a user's body, such as a hand, a leg, or the neck.

The sensor unit 202 obtains angular velocities and an acceleration in the u-v-w coordinate system, which is a first coordinate system fixed in the input device 20.

The reference posture specification unit 204 generates the x-y-z coordinate system, which is a second coordinate system, for a reference posture, which is a standard of a user's posture.

The rotation matrix calculator 206 calculates a rotation matrix that transforms angular velocities in the first coordinate system, i.e., the u-v-w coordinate system, into angular velocities in the second coordinate system, i.e., the x-y-z coordinate system, using an acceleration in the first coordinate system. One axis of the second coordinate system, i.e., the x-y-z coordinate system, may match a gravity direction. In addition, the rotation matrix may be calculated using Euler angles around respective axes of the first coordinate system, i.e., the u-v-w coordinate system, with respect to the second coordinate system, i.e., the x-y-z coordinate system.

The characteristic value calculator 208 calculates characteristic values in the second coordinate system, the x-y-z coordinate system, using angular velocities in the second coordinate system, the x-y-z coordinate system. The characteristic values may be calculated using a first rotation angle and a second rotation angle that correspond to rotation angles around two axes of the second coordinate system, the x-y-z coordinate system. In addition, characteristic values relating to rotation angles around axes of the second coordinate system, the x-y-z coordinate system, may be calculated using angular velocities in the second coordinate system, the x-y-z coordinate system.

The command specification unit 210 specifies a command using the characteristic values. The command specification unit 210 may select one of an arbitrary number of candidates for the command in accordance with the characteristic values. In addition, the command specification unit 210 may dynamically change the number of candidates for the command. The transmitter 212 transmits the command to input the command into a device. The input device 20 may further include the switch 29 that specifies a timing at which a reference posture is set.

In addition, the reference posture specification unit 204 may specify the reference posture when a user starts a motion.

The input device 20 and the controller 30 are electrically connected by wired link or wireless link. In the example illustrated in FIG. 1, the input device 20 communicates with the controller 30 using Bluetooth (Registered Trademark).

As illustrated in FIG. 1, the controller 30 may be a smartphone or a personal computer. The controller 30 may be connected to an output device 38. The output device 38 is, for example, a loudspeaker.

The controller 30 includes a communicator 32, a central processing unit (CPU) 34, and a memory (RAM) 36. The communicator 32 receives commands from the input device 20. The central processing unit (CPU) 34 performs a specified process in response to the command that the communicator 32 receives. The RAM 36 may store a computer program that specifies operation of the CPU 34. Results of processes performed by the CPU 36 are output from the output device 38 to a user. The output device 38 is, for example, a display, a loudspeaker, or the like. The output device 38, such as a display or a loudspeaker, may be combined with a device worn on a body, such as the input device 20, so as to be integrated. Alternatively, the output device 38 such as a display or a loudspeaker may be worn on a body separately from the input device 20.

As described above, the input device 20 converts sensor information obtained from an input device that is worn on a body, a hand, or a leg, into a coordinate system that is suited to human senses, and selects a command for controlling a device. Thus a user can operate a device in a free body position or posture.

By using the input device 20 according to the embodiment, a user can start a body motion in a free body position and posture, and therefore convenience is enhanced for a user. In addition, the input device 20 enables matching a natural movement of a person and an operation regardless of a start position or posture of a body motion, and therefore the learning burden on a user can be reduced. Further, the input device 20 enables providing two continuous characteristic values, and therefore the input device 20 can be applied to analog operations, such as sound volume adjustment or the movement of a pointer. In addition, the input device 20 does not use an acceleration sensor for purposes other than the determination of Euler angles in a reference posture, and therefore an influence of noise or inertia components can be reduced. Further, in the input device 20, only an angular velocity sensor obtains rotation angles after the reference posture is specified, and therefore there is an advantage wherein the input device 20 is not influenced by rotation angles when a sudden rotation is not performed even during a translational movement of an entire body, such as normal walking.

FIG. 23 illustrates an exemplary configuration of the input device 20 according to the embodiment. A computer 100 includes a Central Processing Unit (CPU) 102, a Read Only Memory (ROM) 104, a Random Access Memory (RAM) 106, and an interface 108. These components are connected to each other via a bus line 114, and can transmit/receive various items of data to/from each other under the control of the CPU 102. The interface 108 is connected to a sensor 110 and a transmitter 112.

The Central Processing Unit (CPU) 102 controls operations of the computer 100, and functions as a control processing unit of the computer 100. The Read Only Memory (ROM) 104 is a read-only semiconductor memory in which a specified basic control program has been stored. The CPU 102 can control operations of respective components of the computer 100 by reading and executing the basic control program at the time of starting the computer 100. The Random Access Memory (RAM) 106 is a semiconductor memory that is writable and readable at any time and that the CPU 102 uses as a working area as needed when the CPU 102 executes various control programs. The interface 108 manages the transmission/reception of various types of information to/from various pieces of equipment that are connected to the computer 100. The sensor 110 may be an angular velocity sensor or an acceleration sensor. The transmitter 112 transmits calculation results of the CPU 102 as electric signals to the outside. In addition, the switch 29 of FIG. 1 may be connected to the interface 108, although this is not illustrated.

In order to configure the input device 20 using the computer 100 as described above, a control program, for example, is prepared for causing the CPU 102 to perform processes performed by respective processing units as described above. The prepared control program has been stored in the ROM 104 or the RAM 106. Then, a specified instruction is given to the CPU 102 so as to read and execute the control program. As a result, functions that an information processing unit has are provided by the CPU 102.

The input device 20 illustrated in FIG. 1 includes the sensor unit 202, the reference posture specification unit 204, the rotation matrix calculator 206, the characteristic value calculator 208, the command specification unit 210, and the transmitter 212. However, some or all of the reference posture specification unit 204, the rotation matrix calculator 206, the characteristic value calculator 208, and the command specification unit 210 may be provided in the controller 30. In addition, the input device 20 and the controller 30 may be integrated. In this case, the transmitter 212 of the input device 20 and the communicator 32 of the controller 30 may be omitted. Further, the input device 20, the controller 30, and the output device 38 may be integrated.

<Input Process>

Figure 24:
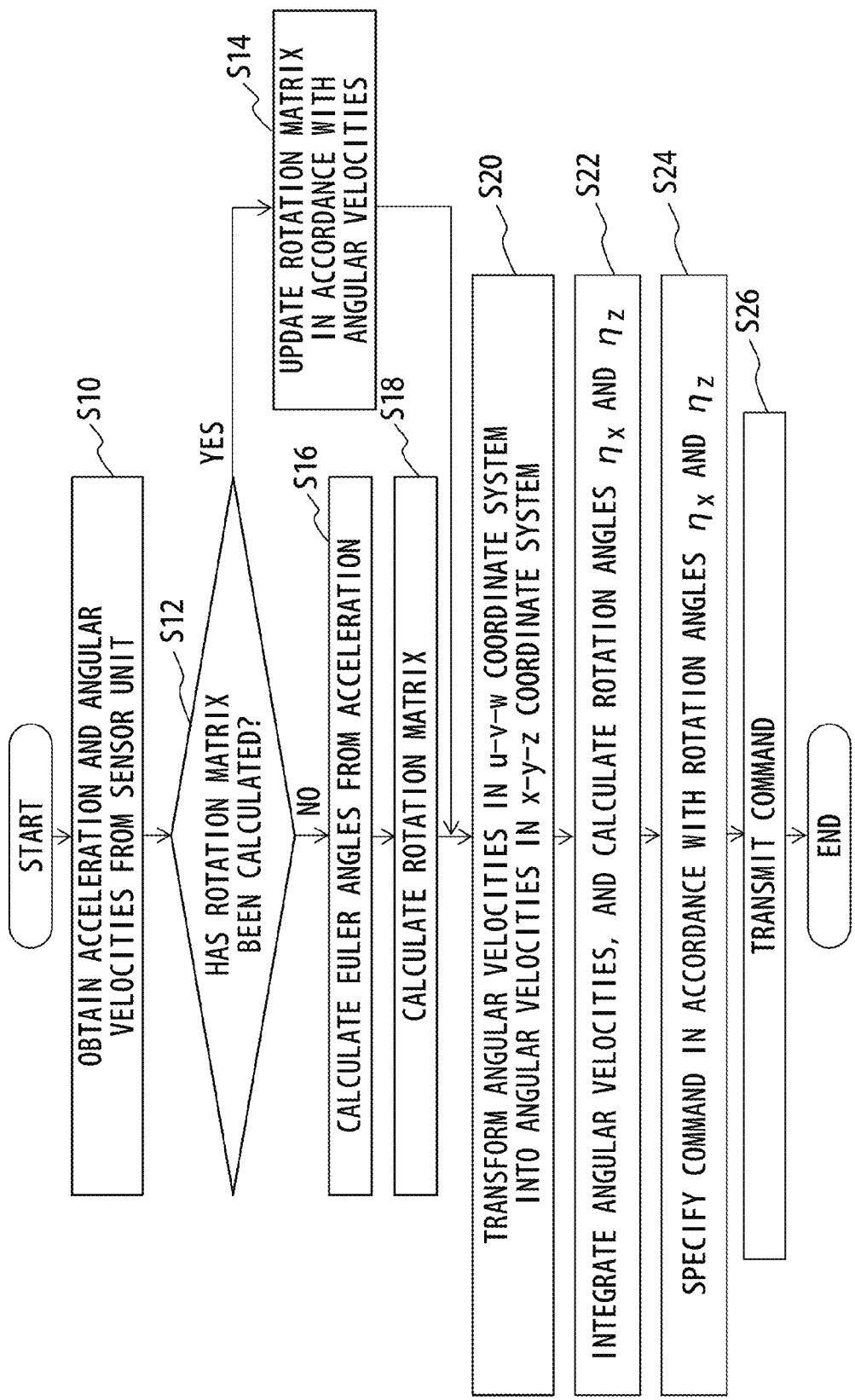
FIG. 24 illustrates an example of a processing flow of the input device according to the first embodiment.

FIG. 24 illustrates an exemplary flow of an input process according to the first embodiment. When the input device 20 is the general-purpose computer 100 as illustrated in FIG. 23, the description below defines a control program for performing processes performed by the general-purpose computer 100. In other words, the description below is a description of a control program for causing a general-purpose computer to perform the processes described below.

When a process is started, the sensor unit 202 of the input device 20 obtains an acceleration and angular velocities in S10. The reference posture specification unit 204 of the input device 20 may specify a posture at the time of starting a motion to be a reference posture, and may generate an orthogonal coordinate system x-y-z with reference to the reference posture.

In S12, the rotation matrix calculator 206 of the input device 20 determines whether a rotation matrix R has been calculated. When the rotation matrix R has been calculated, the process moves to S14. When the rotation matrix R has not been calculated, the process moves to S16.

In S14, the rotation matrix calculator 206 of the input device 20 updates the rotation matrix using the angular velocities. It is assumed that respective angular velocities at the time of time t=n*dt are ωx(n), ωy(n), and ωz(n). It is also assumed that respective Euler angles at the time of time t=n*dt are θ(n), ψ(n), and φ(n). Similarly, it is assumed that respective Euler angles at the time of time t=(n−1)*dt are θ(n−1), ψ(n−1), and φ(n−1). Here, dt is a sampling cycle, i.e., a time difference between a time of obtaining previous angular velocities and a time of obtaining current angular velocities. The Euler angles θ(n), ψ(n), and φ(n) at the time of time t=n*dt are obtained by the following expression:

$$\begin{bmatrix} \theta(n) \\ \psi(n) \\ \phi(n) \end{bmatrix} = \begin{bmatrix} \theta(n-1) \\ \psi(n-1) \\ \phi(n-1) \end{bmatrix} + \begin{bmatrix} \omega_x(n) \\ \omega_y(n) \\ \omega_z(n) \end{bmatrix} dt$$

Using these updated Euler angles θ(n), ψ(n), and φ(n), the rotation matrix R is updated as the following:

$$R = \begin{bmatrix} 1 & 0 & 0 \\ 0 & \cos\theta & -\sin\theta \\ 0 & \sin\theta & \cos\theta \end{bmatrix} \begin{bmatrix} \cos\psi & 0 & \sin\psi \\ 0 & 1 & 0 \\ -\sin\psi & 0 & \cos\psi \end{bmatrix} \begin{bmatrix} \cos\phi & -\sin\phi & 0 \\ \sin\phi & \cos\phi & 0 \\ 0 & 0 & 1 \end{bmatrix}$$

When the process of S14 is finished, the process moves to S20.

In S16, the rotation matrix calculator 206 of the input device 20 calculates Euler angles θ, ψ, and φ using the obtained acceleration. An orientation of a gravity acceleration G is made to match a negative direction of the z axis. The rotation matrix calculator 206 of the input device 20 calculates the Euler angle θ around the x axis of the u-v-w coordinate system with respect to the x-y-z coordinate system by the following expression:

$$\theta = \sin^{-1} \frac{a_v}{G}$$

In addition, u and w components of the gravity acceleration are assumed to be au and aw, respectively. The rotation matrix calculator 206 of the input device 20 calculates the Euler angle ψ around the y axis of the u-v-w coordinate system with respect to the x-y-z coordinate system by the following expression:

$$\psi = \tan^{-1} \frac{a_u}{a_w}$$

When the process of S16 is finished, the process moves to S18.

In S18, the rotation matrix calculator 206 of the input device 20 calculates a rotation matrix R that transforms angular velocities in the u-v-w coordinate system into angular velocities in the x-y-z coordinate system using the Euler angles θ, ψ, and φ. Using these Euler angles θ, ψ, and φ, a rotation matrix R can be calculated by the expression used in S14. When the process of S18 is finished, the process moves to S20.

In S20, the characteristic value calculator 208 of the input device 20 transforms angular velocities in the u-v-w coordinate system into angular velocities in the x-y-z coordinate system using the rotation matrix R. As an example, the transformation of angular velocities ωu, ωv, and ωw in the u-v-w coordinate system into angular velocities ωx, ωy, and ωz in the x-y-z coordinate system can be calculated by the following expression:

$$\begin{bmatrix} \omega_x \\ \omega_y \\ \omega_z \end{bmatrix} = R \begin{bmatrix} \omega_u \\ \omega_v \\ \omega_w \end{bmatrix}$$

When the process of S20 is finished, the process moves to S22.

In S22, the characteristic value calculator 208 of the input device 20 integrates the angular velocities to calculate rotation angles ηx and ηz. As an example, the characteristic value calculator 208 respectively calculates a rotation angle ηx around the x axis and a rotation angle ηz around the z axis by the following expressions:

$$\eta_x = \eta_x(0) + \sum \frac{(\omega_x(n) + \omega_x(n-1)) \cdot dt}{2}$$

$$\eta_z = \eta_z(0) + \sum \frac{(\omega_z(n) + \omega_z(n-1)) \cdot dt}{2}$$

When the process of S22 is finished, the process moves to S24.

In S24, the command specification unit 210 of the input device 20 specifies a command in accordance with the rotation angles ηx and ηz, which are characteristic values. As an example, the command specification unit 210 of the input device 20 selects one of "up", "down", "right", and "left" in accordance with the rotation angles ηx and ηz, as described with reference to FIG. 18. When the process of S24 is finished, the process moves to S26. In S26, the transmitter 212 of the input device 20 transmits the command specified in S24.

The processes described above are performed so as to convert sensor information that is obtained from an input device that is worn on a body, a hand, or a leg, into a coordinate system that is suited to human senses, and to select a command for controlling a device. Thus a user can operate a device in a free body position or posture.

The processes described above enable starting a body motion in a free body position and posture, and therefore convenience is enhanced for a user. In addition, the input device 20 enables matching a natural movement of a person and an operation regardless of a start position or posture of a body motion, and therefore the learning burden on a user can be reduced. Further, the processes described above are performed so as to provide two continuous characteristic values, and therefore the processes described above can be applied to analog operations, such as sound volume adjustment or the movement of a pointer. In addition, in the processes described above, an acceleration sensor is not used for purposes other than the determination of Euler angles in a reference posture, and therefore an influence of noise or inertia components due to movement can be reduced. Further, in the processes described above, only an angular velocity sensor obtains rotation angles after the reference posture is specified, and therefore there is an advantage wherein the processes described above are not influenced by rotation angles when a sudden rotation is not performed even during a translational movement of an entire body, such as normal walking.

Second Embodiment

The information processing device 10 according to the first embodiment includes the input device 20 worn on a distal portion of a user's arm, such as a user's wrist. Information processing devices (200, 210, and 220) according to the second embodiment include an additional measurement device worn on a user's chest, head, or the like, in addition to the input device 20. By employing the configuration above, in various postures (e.g., lying down or standing) of a person, a sensory direction of a person is made to coincide with a direction used for a process in a device, and the movement of a body is associated with an appropriate input operation. As an example, in a case in which a person maintains an underside of a vehicle while lying down, a case in which a person inspects under a floor while lying down, a case in which a person sits in a reclining chair with a body inclined, or in other cases, the operability of a device may be improved. An operation method that is suited for human senses may be provided even when a user is lying down, for example.

<<Input Device>>

Figure 25:
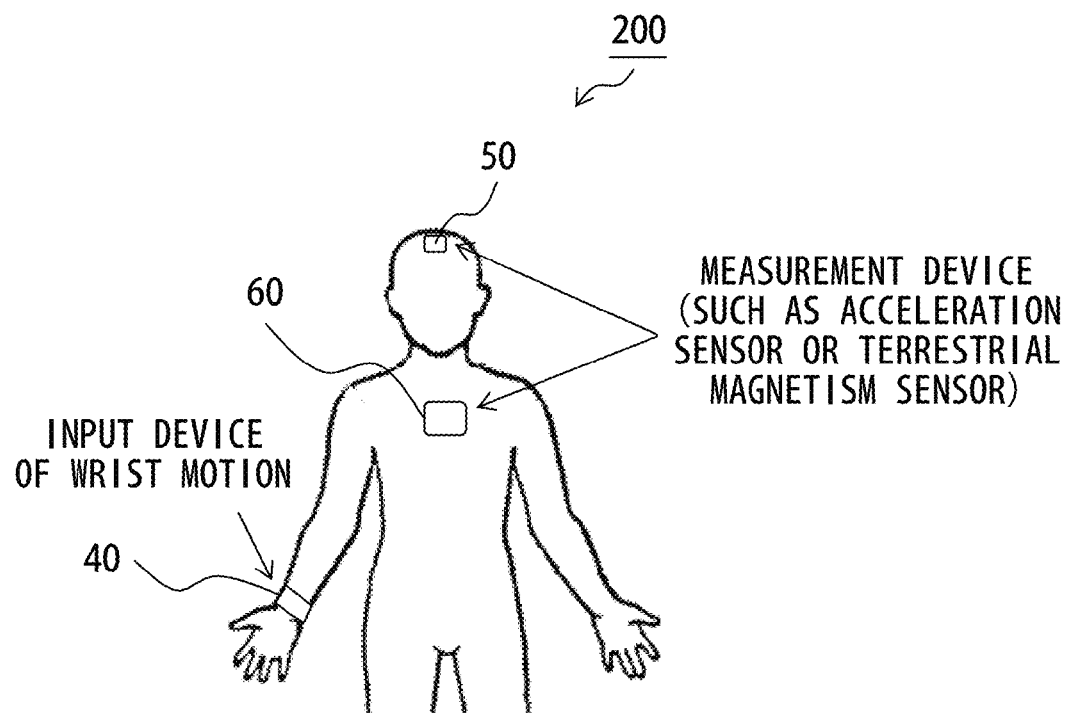
FIG. 25 illustrates an example of a method for using an input device according to a second embodiment.

FIG. 25 is an example of a method for using an input device according to the second embodiment. The information processing device 200 illustrated in FIG. 25 includes an input device 40 that is worn on a distal portion of a user's arm, such as a user's wrist, a measurement device 50 that is worn on a head, and a measurement device 60 that is worn on a chest. Hereinafter, a portion of a trunk from the heart to the lungs of a user is sometimes referred to as a "chest portion" (or simply a "chest"), and a portion above the neck is sometimes referred to as a "head portion" (or simply a "head").

The input device 40 has a configuration similar to that of the input device 20 illustrated in FIG. 1. The input device 20 includes an angular velocity sensor and an acceleration sensor, which is the sensor unit 202, as described above, and calculates a rotation matrix in the rotation matrix calculator 206 using information obtained by the sensor unit 202. However, the input device 40 according to the second embodiment has a function for correcting a rotation matrix using information obtained by the measurement devices 50 and 60, in addition to information that is obtained by the angular velocity sensor and the acceleration sensor included in the input device 40.

The measurement devices 50 and 60 may be an acceleration sensor, a terrestrial magnetism sensor, or the like. Note that, FIG. 25 illustrates both the measurement device 50 worn on a head portion and the measurement device 60 worn on a chest, but only one of the measurement devices may be used.

Figure 26:
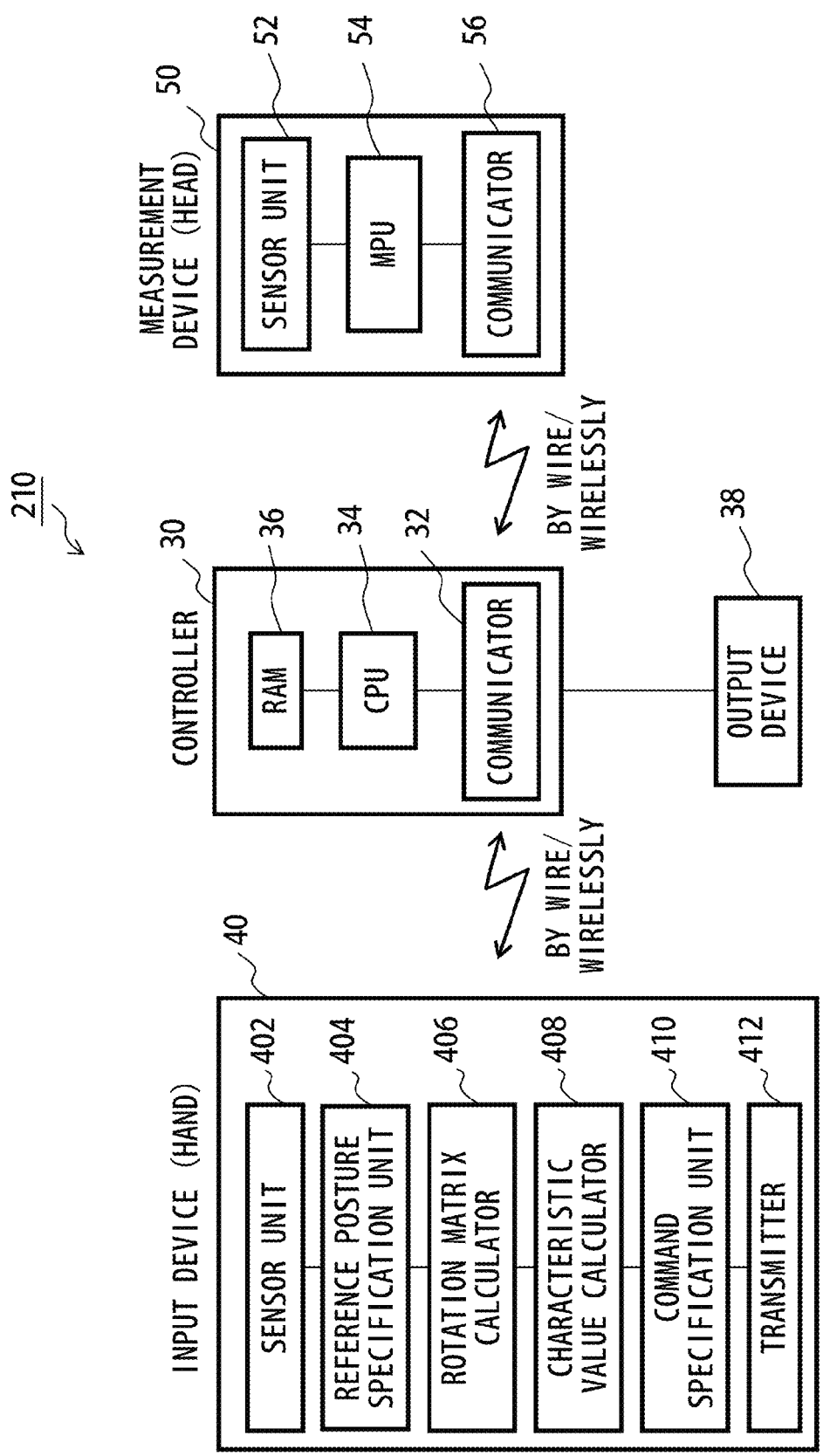
FIG. 26 illustrates an example of a functional block of the input device according to the second embodiment.

FIG. 26 illustrates an example of a functional block of the input device according to the second embodiment. An information processing device 210 illustrated in FIG. 26 includes an input device 40 that is worn on a distal portion of a user's arm, such as a user's wrist, a controller 30, and a measurement device 50 that is worn on a portion above the neck, such as a user's head portion. The input device 40 and the controller 30 are electrically connected to each other by a wired link or wireless link. In addition, the measurement device 50 and the controller 30 are electrically connected to each other by a wired link or wireless link. The measurement device 50 and the input device 40 may be electrically connected to each other by a wired link or wireless link.

The measurement device 50 includes a sensor unit 52, a micro processing unit (MPU) 54, and a communicator 56. The sensor unit 52 obtains a gravity direction. The sensor unit 52 may be an acceleration sensor, a terrestrial magnetism sensor, or the like. The description below is given using an example in which the sensor unit 52 includes an acceleration sensor, but the sensor unit 52 may be provided separately from the measurement device 50, and may obtain an acceleration from the acceleration sensor. In this case, the acceleration sensor is worn on a head portion separately from the input device 20. The MPU 54 performs filtering that removes high-frequency components from information relating to the acceleration obtained by the sensor unit 52. In this embodiment, high-frequency components are removed from a measurement value obtained by the sensor unit 52, but a filter may be provided separately so as to remove the high-frequency components. As a result of the filtering, noise components, such as the trembling of a hand or the minute movement of a hand, can be removed. Further, the MPU 54 of the measurement device 50 calculates angles $\alpha$ and $\beta$ as the following.

FIG. 27A illustrates an example of an orthogonal coordinate system for a reference posture. FIG. 27B illustrates an example of an orthogonal coordinate system for a posture that deviates from the reference posture. When a head portion is not parallel to a gravity vector and is inclined, as illustrated in FIG. 27B, t axis is corrected by the amount of inclination from the gravity vector.

Assuming that a coordinate system fixed in a device that is held in a hand or is worn around a wrist is a u-v-w coordinate system (sometimes referred to as a first coordinate system), z axis passes through the coordinate origin of the u-v-w coordinate system, and that is parallel to the gravity vector and has a direction opposite to that of the gravity vector. X axis passes through the coordinate origin of the u-v-w coordinate system, and is orthogonal to the z axis and a v axis. Y axis passes through the coordinate origin of the u-v-w coordinate system, and is orthogonal to the z axis and the x axis. In this case, the x and y axes are on a horizontal plane, regardless of inclination of the u and w axes with respect to the gravity vector (a twist of an arm). An x-y-z coordinate system having the configuration above is sometimes referred to as a second coordinate system.

As illustrated in FIG. 27A, the measurement device 50 measures a gravity direction, and generates t axis in a direction opposite to the gravity direction, s axis in a forward direction, and r axis in a direction orthogonal to the t and s axes. An r-s-t coordinate system having the configuration above is sometimes referred to as a third coordinate system.

An angle between the s axis and the gravity direction within an s-t plane formed by the s and t axes is assumed to be $\alpha$. Assuming that a magnitude of a gravity acceleration vector is G and that a magnitude of an acceleration vector in an s-axis direction is $a_s$, the angle $\alpha$ is calculated by the following:

$$\alpha = \sin^{-1}\frac{a_s}{G}$$

In addition, an angle between the r axis and the gravity direction within an r-t plane formed by the r and t axes is assumed to be $\beta$. Assuming that a magnitude of a gravity acceleration vector is G and that a magnitude of an acceleration vector in the r-axis direction is $a_r$, the angle β is calculated by the following:

$$\beta = \sin^{-1} \frac{a_r}{G}$$

The angles α and β calculated by the MPU 54 of the measurement device 50 are transmitted by the communicator 56. In this example, the angles α and β are calculated by the MPU 54 of the measurement device 50, but the angles α and β may be calculated by the controller in accordance with a posture of a head. The measurement device 50 may perform measurement periodically, or may perform measurement in response to a request from the input device 40. In a case in which the measurement device 50 performs measurement in response to the request from the input device 40, an acceleration sensor worn on the head may have a low operation frequency. This allows costs for the measurement device 50 to be reduced.

The input device 40 includes a sensor unit, a micro processing unit (MPU), a communicator, a fixture, and a reference posture specification switch, similarly to the input device 20 illustrated in FIG. 1. The reference posture specification switch of the input device 40 is used for specifying a reference posture. In addition, the reference posture specifying switch may be a dorsiflexion detection switch, similarly to the first embodiment. The dorsiflexion detection switch can be pressed by bending a user's wrist toward the back of the user's hand. When the dorsiflexion detection switch is pressed, a reference posture may be specified. In addition, a user's posture at a time when a specified time period such as two seconds or five seconds has passed after pressing the dorsiflexion detection switch may be specified to be a reference posture.

A sensor unit 402 has a configuration similar to that of the sensor unit 202 of the input device 20 illustrated in FIG. 1, and therefore the detailed description thereof is omitted. The sensor unit 402 obtains an angular velocity and an acceleration.

A reference posture specification unit 404 has a configuration similar to that of the reference posture specification unit 204 of the input device 20 illustrated in FIG. 1, and therefore the detailed description thereof is omitted. The reference posture specification unit 404 specifies a posture at the time when a user starts a motion to be a reference posture, and generates an orthogonal coordinate system x-y-z for the reference posture.

A rotation matrix calculator 406 calculates Euler angles θ, ψ, and φ around respective x, y, and z axes of a u-v-w coordinate system with respect to the x-y-z coordinate system from a value of an acceleration sensor of the sensor unit 52. The rotation matrix calculator 406 appropriately updates a rotation matrix R. A method for obtaining a posture from a gravity acceleration is likely to be influenced by noise or an inertia acceleration during a motion. In view of this, a rotation matrix R may be updated according to angular velocities of respective axes. The rotation matrix calculator 406 has a configuration similar to that of the rotation matrix calculator 206 of the input device 20 illustrated in FIG. 1, and therefore the detailed description thereof is omitted.

The rotation matrix calculator 406 calculates a rotation matrix R that transforms angular velocities in the u-v-w coordinate system into angular velocities in the x-y-z coordinate system using the Euler angles θ, ψ, and φ. The rotation matrix R is defined using the Euler angles θ, ψ, and φ as the following:

$$R = \begin{bmatrix} 1 & 0 & 0 \\ 0 & \cos\theta & -\sin\theta \\ 0 & \sin\theta & \cos\theta \end{bmatrix} \begin{bmatrix} \cos\psi & 0 & \sin\psi \\ 0 & 1 & 0 \\ -\sin\psi & 0 & \cos\psi \end{bmatrix} \begin{bmatrix} \cos\phi & -\sin\phi & 0 \\ \sin\phi & \cos\phi & 0 \\ 0 & 0 & 1 \end{bmatrix}$$

In addition, the rotation matrix calculator 406 corrects angular velocities using information relating to angles α and β that is transmitted from the measurement device 50. Here, a rotation matrix Rc for correction is defined by the following:

$$R_c = \begin{bmatrix} 1 & 0 & 0 \\ 0 & \cos\alpha & \sin\alpha \\ 0 & -\sin\alpha & \cos\alpha \end{bmatrix} \begin{bmatrix} \cos\beta & 0 & \sin\beta \\ 0 & 1 & 0 \\ -\sin\beta & 0 & \cos\beta \end{bmatrix}$$

Using the rotation matrix Rc for correction, the transformation of ωu, ωv, and ωw into ωx, ωy, and ωz is expressed by the following:

$$\begin{bmatrix} \omega_x \\ \omega_y \\ \omega_z \end{bmatrix} = R_c R \begin{bmatrix} \omega_u \\ \omega_v \\ \omega_w \end{bmatrix}$$

As is apparent from the expression above, the rotation expressed by Rc functions as a correction to the rotation expressed by R.

A characteristic value calculator 408 integrates angular velocities transformed into the x-y-z coordinate system, calculates rotation angles ηx and ηz respectively around the x axis and the z axis, and defines the rotation angles ηx and ηz to be characteristic values. The rotation angles ηx and ηz are calculated by the following, similarly to the first embodiment.

$$\eta_x = \int \omega_x dt$$

$$\eta_z = \int \omega_z dt$$

The characteristic value calculator 408 has a configuration similar to that of the characteristic value calculator 208 of the input device 20 illustrated in FIG. 1, and therefore the detailed description thereof is omitted. Similarly to the first embodiment, the auxiliary characteristic value may be detected in addition to the rotation angles ηx and ηz, and may be used for the specification of a command.

A command specification unit 410 specifies a command for operation of equipment in accordance with the characteristic values calculated by the characteristic value calculator 408. The command specification unit 410 has a configuration similar to that of the command specification unit 210 of the input device 20 illustrated in FIG. 1, and therefore the detailed description thereof is omitted.

A transmitter 412 transmits a command generated by the command specification unit 410 to the controller 30. The transmitter 412 has a configuration similar to that of the transmitter 212 of the input device 20 illustrated in FIG. 1, and therefore the detailed description thereof is omitted. The controller 30 has been described above, and therefore the detailed description thereof is omitted.

The measurement device 50 described above merely measures accelerations, but may further perform posture estimation using angular velocities. As a method for this, a method similar to a method for updating a rotation matrix of a hand as described in the first embodiment may be used.

As described above, the measurement device 50 is worn on a head portion separately from the input device 40, and angular velocities in the x-y-z coordinate system are corrected using information obtained by the measurement device 50 such that a user can perform the operation of a device that is more suited for the user's senses in a free body position or posture. Particularly, in the example above, the measurement device 50 is worn on a head, and therefore a user can operate a device with senses that match images that the user is viewing.

Figure 28:
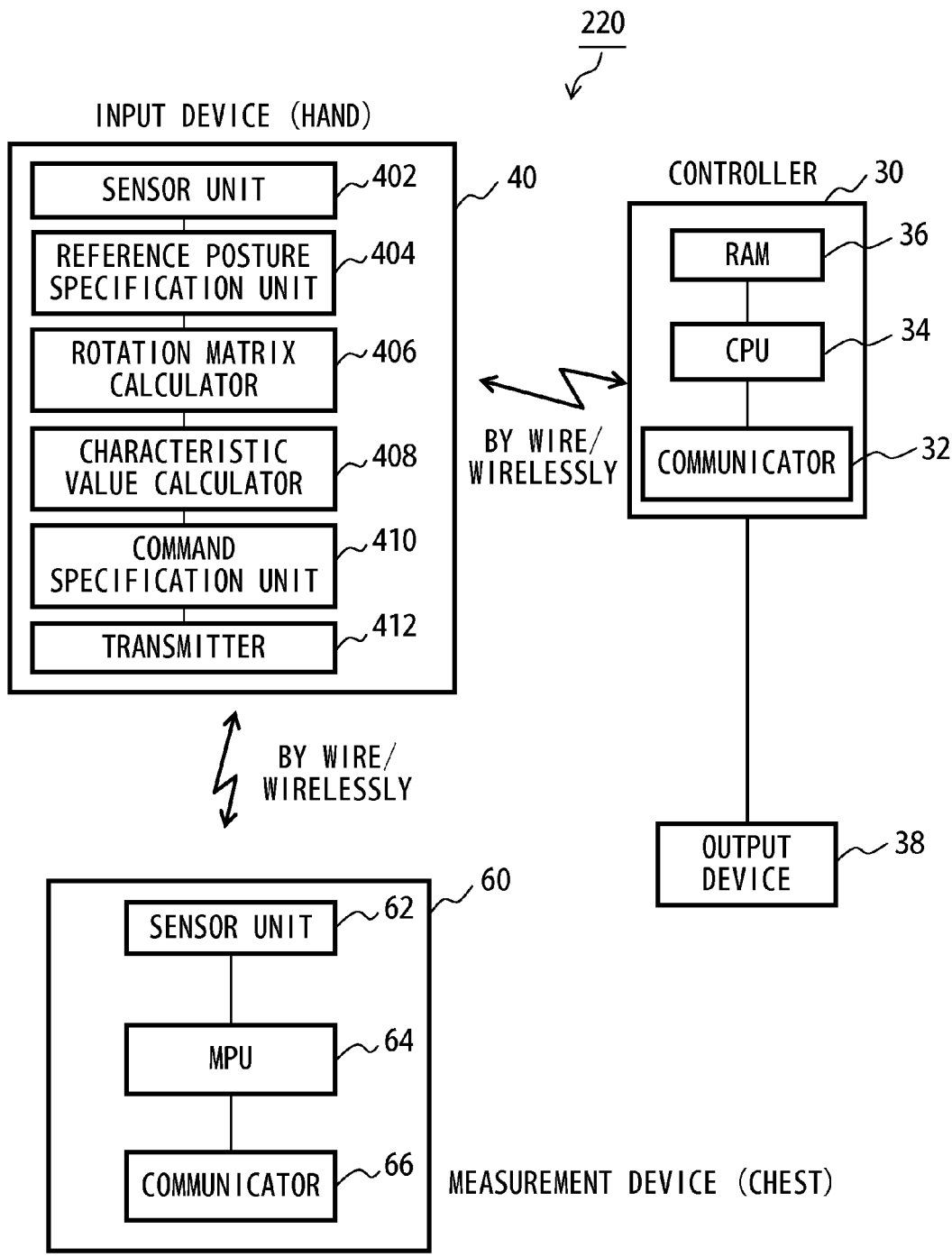
FIG. 28 illustrates another example of the functional block of the input device according to the second embodiment.

FIG. 28 illustrates another example of a functional block of the input device according to the second embodiment. In the example illustrated in FIG. 28, devices worn on a hand and a chest perform communication with each other, and correct a coordinate system in accordance with a chest posture. Corrected sensor data is transmitted to a controller. Here, a sensing cycle of the device worn on a hand may be different from that of the device worn on a chest. As an example, a measurement cycle of a measurement device worn on a chest may be shortened so as to suppress power consumption, or a measurement device worn on a chest may perform measurement in a short cycle such as that of an input device worn around a wrist so as to estimate a posture in real time.

An information processing device 220 illustrated in FIG. 28 includes an input device 40 worn on a distal portion of a user's arm, such as a user's wrist, a controller 30, and a measurement device 60 worn on a user's chest, for example. The information processing device 220 illustrated in FIG. 28 includes the measurement device 60 worn on a user's chest, for example, instead of the measurement device 50 worn on a portion above the neck, such as a user's head portion, of the information processing device 210 illustrated in FIG. 26.

The measurement device 60 includes a sensor unit 62, a micro processing unit (MPU) 64, and a communicator 66. The sensor unit 62 obtains a gravity direction. The sensor unit 62 may be an acceleration sensor, a terrestrial magnetism sensor, or the like. The description below is given using an example in which the sensor unit 62 includes an acceleration sensor; however, the sensor unit 62 may be provided separately from the measurement device 60, and may obtain an acceleration from an acceleration sensor. In this case, the acceleration sensor is worn on a chest portion separately from the input device 20. The MPU 64 performs filtering that removes high-frequency components from information relating to the acceleration obtained by the sensor unit 62. In this embodiment, high-frequency components are removed from a measurement value obtained by the sensor unit 62, but a filter may be provided separately so as to remove the high-frequency components. Further, the MPU 64 of the measurement device 60 calculates angles α and β as described below.

Figure 29A:
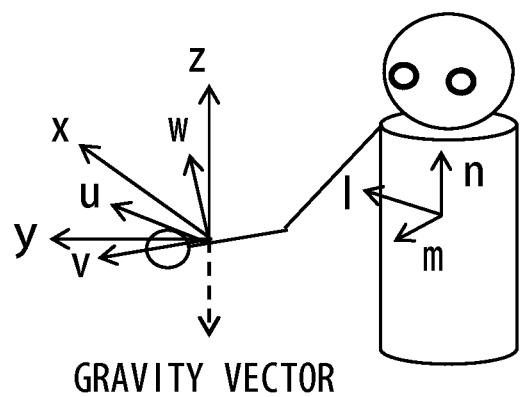
FIG. 29A illustrates another example of the orthogonal coordinate system for the reference posture.
Figure 29B:
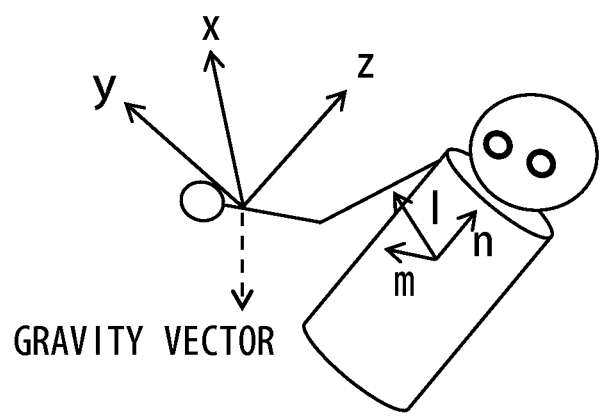
FIG. 29B illustrates another example of an orthogonal coordinate system for a posture that deviates from the reference posture.

FIG. 29A illustrates an example of an orthogonal coordinate system for the reference posture. FIG. 29B illustrates an example of an orthogonal coordinate system for a posture that deviates from the reference posture.

Assuming that a coordinate system that is fixed in a device held in a hand or worn around a wrist is a u-v-w coordinate system, z axis passes through the coordinate origin of the u-v-w coordinate system, and is parallel to a gravity vector and has a direction opposite to that of the gravity vector. X axis passes through the coordinate origin of the u-v-w coordinate system, and is orthogonal to the z axis and a v axis. Y axis passes through the coordinate origin of the u-v-w coordinate system, and is orthogonal to the z axis and the x axis. In this case, the x and y axes are on a horizontal plane, regardless of an inclination of the u and w axes with respect to the gravity vector (a twist of an arm).

As illustrated in FIG. 29A, the measurement device 60 measures a gravity direction, and generates n axis in a direction opposite to gravity, m axis in an anterior direction of a chest, and l axis in a direction orthogonal to the n axis and the m axis. An l-m-n coordinate system that has the configuration above may be referred to as a third coordinate system.

An angle between the m axis and the gravity direction within an m-n plane formed by the m axis and the n axis is assumed to be α. Assuming that a magnitude of a gravity acceleration vector is G and that a magnitude of an acceleration vector in an m-axis direction is $a_m$, the angle α is calculated by the following:

$$\alpha = \sin^{-1}\frac{a_m}{G}$$

In addition, an angle between the l axis and the gravity direction within an l-n plane formed by the l axis and the n axis is assumed to be β. Assuming that a magnitude of the gravity acceleration vector is G and that a magnitude of an acceleration vector in an l-axis direction is $a_l$, the angle β is calculated by the following:

$$\beta = \sin^{-1}\frac{a_l}{G}$$

Information relating to the angles α and β calculated by the MPU 62 of the measurement device 60 are transmitted by the communicator 56. Configurations of the input device 40 and the controller 30 have been described above, and therefore the detailed descriptions thereof are omitted.

In this example, the measurement device 60 may perform measurement periodically or in response to requests from the input device 40. When the measurement device 60 performs measurement in response to the requests from the input device 40, an acceleration sensor worn on a head may have a low operation frequency. This allows costs for the measurement device 60 to be reduced.

As described above, the measurement device 60 is worn on a chest portion separately from the input device 40, and angular velocities in the x-y-z coordinate system are corrected using information obtained by the measurement device 60 such that a user can perform the operation of a device that is more suited for the user's senses in a free body position or posture. Particularly, in the example above, the measurement device 60 is worn on a chest, and this allows a user to operate a device with senses that match a body orientation.

In addition, in the embodiment above, the measurement devices 50 or 60 calculate the angles α and β, but the controller 30 or the input device 40 may calculate the angles α and β. When the controller 30 calculates the angles α and β, the controller 30 may receive angles obtained by the measurement devices 50 or 60, calculate the angles α and β, and transmit the angles α and β to the input device 40. When the input device 40 calculates the angles α and β, the input device 40 may receive angles obtained by the measurement devices 50 or 60, and calculate the angles α and β.

Described below is a manner of correcting angular velocities in the information processing devices 210 and 220 according to the second embodiment.

Figure 30:
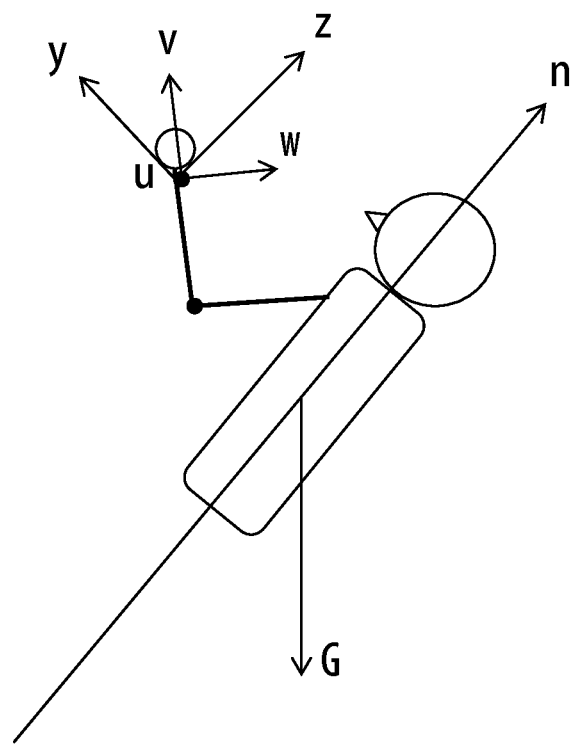
FIG. 30 illustrates still another example of an orthogonal coordinate system for a posture that deviates from the reference posture.

FIG. 30 illustrates an example of an orthogonal coordinate system for a posture that deviates from the reference posture. In the example illustrated in FIG. 30, a user bends backward.

FIGS. 31A and 31B illustrate examples of a temporal change in an angular velocity that is measured in a case in which a user's hand is rotated around an axis of the user's body. FIGS. 32A and 32B illustrate examples of a temporal change in a corrected angular velocity in a case in which a user's hand is rotated around an axis of the user's body.

FIGS. 31A and 31B respectively illustrate a temporal change in an angular velocity $\omega_w$ and an angular velocity $\omega_v$ that are measured in a case in which a user's hand is rotated around an axis of the user's body. This case corresponds to a case in which a wrist is rotated around the n axis illustrated in FIG. 30. Both of the curves in FIGS. 31A and 31B indicate that the angular velocities are increased monotonically with respect to time, reach peaks $\omega_w^0$ and $\omega_v^0$, respectively, at time $t_0$, and are decreased monotonically.

FIGS. 32A and 32B respectively illustrate a temporal change in a corrected angular velocity $\omega_z$ and a corrected angular velocity $\omega_y$ in a case in which a user's hand is rotated around an axis of the user's body. As illustrated in FIG. 32A, the angular velocity $\omega_z$ in a z-axis direction is also increased monotonically and reaches peak $\omega_z^0$ at time $t_0$, but the peak value $\omega_z^0$ is greater than $\omega_w^0$ and $\omega_v^0$. After time $t_0$, the angular velocity $\omega_z$ is also decreased monotonically. As illustrated in FIG. 32B, a curve illustrating a temporal change in the corrected angular velocity $\omega_y$ is almost flat, and a peak value $\omega_y^0$ is smaller than $\omega_w^0$ and $\omega_v^0$. The curves of the corrected angular velocities indicate more clearly that a user moves his or her hand leftward and rightward.

Note that the input devices 210 and 220 as described above may be implemented by the computer 100 as illustrated in FIG. 23.

<<Input Process>>

FIG. 33 illustrates an example of a processing flow of the input device according to the second embodiment. When the input device 40 is the general-purpose computer 100 as illustrated in FIG. 23, the description below defines a control program for performing processes performed by the general-purpose computer 100. In other words, the description below is a description of a control program for causing a general-purpose computer to perform the processes described below.

When a process is started, the sensor unit 402 of the input device 40 obtains an acceleration and angular velocities in S40. On this occasion, the reference posture specification unit 404 of the input device 40 may specify a posture at the time when a user starts a motion to be a reference posture, and may generate an orthogonal coordinate system x-y-z with reference to the reference posture.

In S42, the rotation matrix calculator 406 of the input device 40 determines whether a rotation matrix R has been calculated. When the rotation matrix R has been calculated, the process moves to S44. When the rotation matrix R has not been calculated, the process moves to S46.

In S44, the rotation matrix calculator 406 of the input device 40 updates the rotation matrix in accordance with the angular velocities. It is assumed, for example, that respective angular velocities at the time of time t=n*dt are $\omega x(n)$, $\omega y(n)$, and $\omega z(n)$. It is also assumed that respective Euler angles at the time of time t=n*dt are $\theta(n)$, $\psi(n)$, and $\phi(n)$.

Similarly, it is assumed that respective Euler angles at the time of time t=(n−1)*dt are $\theta(n-1)$, $\psi(n-1)$, and $\theta(n-1)$. Here, dt is a sampling cycle, i.e., a time difference between a time of obtaining previous angular velocities and a time of obtaining current angular velocities. The Euler angles $\theta(n)$, $\psi(n)$, and $\phi(n)$ at the time of time t=n*dt are obtained by the following expression:

$$\begin{bmatrix} \theta(n) \\ \psi(n) \\ \phi(n) \end{bmatrix} = \begin{bmatrix} \theta(n-1) \\ \psi(n-1) \\ \phi(n-1) \end{bmatrix} + \begin{bmatrix} \omega_x(n) \\ \omega_y(n) \\ \omega_z(n) \end{bmatrix} dt$$

Using these updated Euler angles $\theta(n)$, $\psi(n)$, and $\theta(n)$, the rotation matrix R can be updated as the following:

$$R = \begin{bmatrix} 1 & 0 & 0 \\ 0 & \cos\theta & -\sin\theta \\ 0 & \sin\theta & \cos\theta \end{bmatrix} \begin{bmatrix} \cos\psi & 0 & \sin\psi \\ 0 & 1 & 0 \\ -\sin\psi & 0 & \cos\psi \end{bmatrix} \begin{bmatrix} \cos\phi & -\sin\phi & 0 \\ \sin\phi & \cos\phi & 0 \\ 0 & 0 & 1 \end{bmatrix}$$

When the process of S44 is finished, the process moves to S50.

In S46, the rotation matrix calculator 406 of the input device 40 calculates Euler angles $\theta$, $\psi$, and $\phi$ from an acceleration. An orientation of a gravity acceleration G is made to match a negative direction of the z axis. The rotation matrix calculator 406 of the input device 40 calculates the Euler angle $\theta$ around the x axis of the u-v-w coordinate system with respect to the x-y-z coordinate system by the following expression:

$$\theta = \sin^{-1} \frac{a_v}{G}$$

In addition, u and w components of the gravity acceleration are assumed to be au and aw, respectively. The rotation matrix calculator 406 of the input device 40 calculates the Euler angle $\psi$ around the y axis of the u-v-w coordinate system with respect to the x-y-z coordinate system by the following expression:

$$\psi = \tan^{-1} \frac{a_u}{a_w}$$

When the process of S46 is finished, the process moves to S48.

In S48, the rotation matrix calculator 406 of the input device 40 calculates a rotation matrix R that transforms angular velocities in the u-v-w coordinate system into angular velocities in the x-y-z coordinate system using the Euler angles $\theta$, $\psi$, and $\phi$. Using these Euler angles $\theta$, $\psi$, and $\phi$, a rotation matrix R can be calculated by the expression used in S44. When the process of S48 is finished, the process moves to S50.

In S50, the rotation matrix calculator 406 of the input device 40 transforms angular velocities in the u-v-w coordinate system into angular velocities in the x-y-z coordinate system using the rotation matrix R. As an example, the conversion of angular velocities $\omega u$, $\omega v$, and $\omega w$ in the u-v-w coordinate system into angular velocities $\omega x$, $\omega y$, and $\omega z$ in the x-y-z coordinate system can be calculated by the following expression:

$$\begin{bmatrix} \omega_x \\ \omega_y \\ \omega_z \end{bmatrix} = R \begin{bmatrix} \omega_u \\ \omega_v \\ \omega_w \end{bmatrix}$$

When the process of S50 is finished, the process moves to S52.

In S52, the rotation matrix calculator 406 of the input device 40 obtains angles α and β for correction from the measurement devices 50 and 60 worn on a head portion and a chest portion.

As described above, the measurement devices 50 and 60 may transmit the information relating to the angles α and β to the input device 40 in response to requests from the input device 40, or may periodically transmit the information relating to the angles α and β to the input device 40. In the former case, since the measurement devices 50 and 60 operate only when the input device 40 issues requests, power consumption and a processing amount are reduced.

In S54, the rotation matrix calculator 406 of the input device 40 obtains angular velocities ωx, ωy, and ωz in the x-y-z coordinate system by the following expression:

$$\begin{bmatrix} \omega_x \\ \omega_y \\ \omega_z \end{bmatrix} = R_c R \begin{bmatrix} \omega_u \\ \omega_v \\ \omega_w \end{bmatrix}$$

using the following expression:

$$R_c = \begin{bmatrix} 1 & 0 & 0 \\ 0 & \cos\alpha & \sin\alpha \\ 0 & -\sin\alpha & \cos\alpha \end{bmatrix} \begin{bmatrix} \cos\beta & 0 & \sin\beta \\ 0 & 1 & 0 \\ -\sin\beta & 0 & \cos\beta \end{bmatrix}$$

As is apparent from the expressions above, the rotation expressed by Rc functions as a correction to the rotation expressed by R. When the process of S54 is finished, the process moves to S56.

In S56, the characteristic value calculator 408 of the input device 40 integrates the angular velocities to calculate rotation angles ηx and ηz. When the process of S56 is finished, the process moves to S58.

In S58, the command specification unit 410 of the input device 40 specifies a command in accordance with the rotation angles ηx and ηz, which are characteristic values. As an example, the command specification unit 410 of the input device 40 selects one of "up", "down", "right", and "left" in accordance with values of the rotation angles ηx and ηz, as described with reference to FIG. 18. When the process of S58 is finished, the process moves to S60. In S60, the transmitter 412 of the input device 40 transmits the command specified in S58.

The processes as described above are performed so as to convert sensor information that is obtained from an input device that is worn on a body, a hand, or a leg, into a coordinate system that is suited to human senses, and to select a command for controlling a device. Thus a user may operate a device in a free body position or posture.

FIG. 34 illustrates an example of a processing flow of a measurement device according to the second embodiment.
In S70, the sensor unit 52 or 62 of the measurement device 50 or 60 obtains acceleration. The process of S70 may be started in response to requests from the input device 40, or may be started periodically. When the process of S70 is finished, the process moves to S72.

In S72, the MPU 54 or 64 of the measurement device 50 or 60 performs filtering that removes high-frequency components from information relating to the acceleration obtained by the sensor unit 52 or 62. In this embodiment, high-frequency components are removed from a measurement value obtained by the sensor unit 52 or 62, but a filter may be provided separately so as to remove the high-frequency components. As a result of the filtering, noise components, such as the trembling of a hand or the minute movement of a hand, can be removed. When the process of S72 is finished, the process moves to S74.

In S74, the MPU 54 or 64 of the measurement device 50 or 60 calculates angles α and β. As illustrated in FIG. 29A, for example, the measurement device 60 measures a gravity direction, and generates the n axis in a direction opposite to the gravity direction, the m axis in an anterior direction of a chest, and the l axis in a direction orthogonal to the n and m axes.

An angle between the m axis and the gravity direction within an m-n plane formed by the m axis and the n axis is assumed to be α. Assuming that a magnitude of a gravity acceleration vector is G and that a magnitude of an acceleration vector in an m-axis direction is $a_m$, the angle α is calculated by the following:

$$\alpha = \sin^{-1} \frac{a_m}{G}$$

In addition, an angle between the l axis and the gravity direction within an l-n plane formed by the l axis and the n axis is assumed to be β. Assuming that a magnitude of a gravity acceleration vector is G and that a magnitude of an acceleration vector in an l-axis direction is $a_l$, the angle β is calculated by the following:

$$\beta = \sin^{-1} \frac{a_l}{G}$$

The same is applied to the measurement device 50. When the process of S74 is finished, the process moves to S76.

In S76, the communicator 52 or 62 of the measurement device 50 or 60 transmits the information relating to the angles α and β that have been obtained in S74.

As described above, the measurement device 60 is worn on a chest portion separately from the input device 40, and angular velocities in the x-y-z coordinate system are corrected using information obtained by the measurement device 60. Thus a user can operate a device with user's senses in a free body position or posture. Particularly, in the example above, the measurement device 60 is worn on a chest, and therefore a user can operate a device with senses that match a body orientation.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An input device that is worn on a portion of a user's body and inputs a command into a controller, the input device comprising:
    a sensor unit configured to obtain angular velocities and an acceleration in a first coordinate system fixed in the input device;
    a processor configured
        to generate a second coordinate system for a reference posture of the user,
        to transform the angular velocities in the first coordinate system into second angular velocities in the second coordinate system using the acceleration in the first coordinate system, and
        to specify a command according to characteristic values calculated by using the second angular velocities; and
    a transmitter configured to transmit the command to the controller.

2. The input device according to claim 1, wherein
    the processor corrects a rotation matrix according to rotation angles calculated by a measurement device,
    the measurement device is fixed to a portion of the user's body where the input device is not worn,
    the measurement device obtains a second acceleration in a third coordinate system and calculates the rotation angles from the third coordinate system to the second coordinate system in accordance with the obtained second acceleration.

3. The input device according to claim 2, wherein the measurement device removes a high-frequency component of a temporal change in the obtained second acceleration in the third coordinate system to calculate the rotation angle.

4. The input device according to claim 1, further comprising a switch configured to specify a timing of specifying the reference posture.

5. The input device according to claim 1, wherein processor specifies the reference posture when the user starts a motion.

6. The input device according to claim 1, wherein one axis of the second coordinate system matches a gravity direction.

7. The input device according to claim 1, wherein the characteristic values are calculated from a first rotation angle and a second rotation angle that correspond to rotation angles around two axes of the second coordinate system.

8. The input device according to claim 1, wherein the processor calculates a rotation matrix using Euler angles around respective axes of the first coordinate system with respect to the second coordinate system.

9. The input device according to claim 1, wherein the processor calculates values relating to rotation angles around axes of the second coordinate system as characteristic values, using the second angular velocities in the second coordinate system.

10. The input device according to claim 1, wherein the processor selects one of candidates for the command in accordance with the characteristic values.

11. The input device according to claim 10, wherein the processor dynamically changes the number of candidates for the command.

12. The input device according to claim 1, wherein the input device is fixed on one of a hand, a leg, and a neck of the user.

13. The input device according to claim 2, wherein the measurement device is fixed in a portion of a trunk from a heart to lungs of the user, or a portion above a neck of the user.

14. An input method for inputting a command into a controller, the input method comprising:
    obtaining, by a processor, angular velocities and an acceleration in a first coordinate system fixed in an input device that is worn on a portion of a user's body;
    generating, by the processor, a second coordinate system for a reference posture of the user;
    transforming, by a processor, the angular velocities in the first coordinate system into second angular velocities in the second coordinate system using the acceleration in the first coordinate system; specifying, by the processor, the command according to the characteristic values calculated by using the second angular velocities; and
    transmitting the command to the controller.

15. A non-transitory computer-readable recording medium having stored therein a program for causing a computer to execute a process for inputting a command into a controller, the process comprising:
    obtaining angular velocities and an acceleration in a first coordinate system fixed in an input device that is worn on a portion of a user's body;
    generating a second coordinate system for a reference posture of the user;
    transforming the angular velocities in the first coordinate system into second angular velocities in the second coordinate system using the acceleration in the first coordinate system;
    specifying the command according to characteristic values calculated by using the second angular velocities; and
    transmitting the command to the controller.

* * * * *